United States Patent
Roth et al.

(10) Patent No.: US 11,224,043 B1
(45) Date of Patent: Jan. 11, 2022

(54) LINERLESS LABELS

(71) Applicant: Iconex LLC, Duluth, GA (US)

(72) Inventors: Joseph D Roth, Springboro, OH (US);
Jody Brookshire, Flowery Branch, GA (US)

(73) Assignee: Iconex LLC, Duluth, GA (US)

( * ) Notice: Subject to any disclaimer, the term of this patent is extended or adjusted under 35 U.S.C. 154(b) by 0 days.

(21) Appl. No.: 16/685,328

(22) Filed: Nov. 15, 2019

Related U.S. Application Data

(60) Continuation of application No. 16/249,370, filed on Jan. 16, 2019, which is a continuation of application
(Continued)

(51) Int. Cl.
| | |
|---|---|
| *B41J 2/32* | (2006.01) |
| *H04W 72/04* | (2009.01) |
| *H04W 24/02* | (2009.01) |
| *H04J 13/18* | (2011.01) |
| *H04W 84/04* | (2009.01) |
| *H04J 11/00* | (2006.01) |
| *H04B 7/06* | (2006.01) |
| *B41M 5/42* | (2006.01) |

(Continued)

(52) U.S. Cl.
CPC ........... *H04W 72/0466* (2013.01); *B41J 2/32* (2013.01); *B41M 5/42* (2013.01); *G09F 3/10* (2013.01); *H04B 7/0632* (2013.01); *H04J 11/0053* (2013.01); *H04J 13/18* (2013.01); *H04W 24/02* (2013.01); *H04W 72/0426* (2013.01); *H04W 84/045* (2013.01); *H04W 48/12* (2013.01); *Y02D 30/70* (2020.08)

(58) Field of Classification Search
CPC ............... G09F 3/10; G09F 2003/0201; G09F 2003/0229; G09F 2003/0241; G09F 2003/0248; C09J 7/02; C09J 2203/334; C09J 2201/28; C09J 2301/204; B41J 3/4075; B41J 2/315; B41J 2/32; B41J 2/33; B41J 2/325; B41F 16/00; B41F 16/0006
See application file for complete search history.

(56) References Cited

U.S. PATENT DOCUMENTS

| | | | |
|---|---|---|---|
| 5,324,078 | A | 6/1994 | Bane |
| 5,351,426 | A | 10/1994 | Voy et al. |

(Continued)

OTHER PUBLICATIONS

"U.S. Appl. No. 13/838,365, Non Final Office Action dated Jul. 8, 2013", 6 pgs.

(Continued)

*Primary Examiner* — Kristal Feggins
(74) *Attorney, Agent, or Firm* — Schwegman Lundberg & Woessner, P.A.

(57) ABSTRACT

Linerless labels are presented. A label includes a specific pattern or set of patterns of adhesive applied to one side of the label. The adhesive pattern(s) reduces contact between a cutter blade of a printer and the adhesive on the one side of the label. Moreover, the adhesive patterns reduce buildup of adhesive on the cutter blade and reduce buildup at specific locations on the cutter blade. That is, the adhesive patterns more evenly distribute adhesive buildup across the cutter blade. Consequently, the cutter blade can be used for a longer period of time before the cutter blade needs to be cleaned of the adhesive.

13 Claims, 11 Drawing Sheets

Related U.S. Application Data

No. 15/225,232, filed on Aug. 1, 2016, now Pat. No. 10,217,384, which is a continuation of application No. 14/215,776, filed on Mar. 17, 2014, now Pat. No. 9,403,392, which is a continuation of application No. 13/838,365, filed on Mar. 15, 2013, now Pat. No. 8,711,190, which is a division of application No. 12/712,380, filed on Feb. 25, 2010, now Pat. No. 8,537,184.

(51) Int. Cl.
*G09F 3/10* (2006.01)
*H04W 48/12* (2009.01)

(56) References Cited

U.S. PATENT DOCUMENTS

| | | | |
|---|---|---|---|
| 5,591,290 A * | 1/1997 | Walter | C09J 7/403 |
| | | | 156/152 |
| 5,897,722 A | 4/1999 | Bright | |
| 6,074,745 A | 6/2000 | Speeney | |
| 6,317,149 B1 | 11/2001 | Mochida et al. | |
| 6,830,795 B1 | 12/2004 | Downs | |
| 6,906,735 B2 | 6/2005 | Bhatt et al. | |
| 7,329,449 B2 | 2/2008 | Wiklof et al. | |
| 7,588,811 B2 | 9/2009 | Blank et al. | |
| 7,742,366 B2 | 6/2010 | Haas | |
| 8,537,184 B2 * | 9/2013 | Roth | B05D 5/10 |
| | | | 347/171 |
| 8,711,190 B2 | 4/2014 | Roth et al. | |
| 9,403,392 B2 | 8/2016 | Roth et al. | |
| 10,217,384 B2 | 2/2019 | Roth et al. | |
| 2004/0067088 A1 | 4/2004 | Kline | |
| 2007/0108757 A1 | 5/2007 | Buck | |
| 2007/0211135 A1 | 9/2007 | Moreland et al. | |
| 2014/0199477 A1 | 7/2014 | Roth et al. | |
| 2017/0092158 A1 | 3/2017 | Roth et al. | |
| 2019/0180652 A1 | 6/2019 | Roth et al. | |

OTHER PUBLICATIONS

"U.S. Appl. No. 13/838,365, Notice of Allowance dated Dec. 13, 2013", 7 pgs.
"U.S. Appl. No. 13/838,365, Response filed Oct. 8, 2013 to Non Final Office Action dated Jul. 8, 2013", 12 pgs.
"U.S. Appl. No. 14/215,776, Final Office Action dated Nov. 18, 2015", 7 pgs.
"U.S. Appl. No. 14/215,776, Non Final Office Action dated May 11, 2015", 7 pgs.
"U.S. Appl. No. 14/215,776, Non Final Office Action dated Oct. 24, 2014", 7 pgs.
"U.S. Appl. No. 14/215,776, Notice of Allowance dated Mar. 30, 2016", 6 pgs.
"U.S. Appl. No. 14/215,776, Response filed Jan. 26, 2015 to Non Final Office Action dated Oct. 24, 2014", 7 pgs.
"U.S. Appl. No. 14/215,776, Response filed Mar. 14, 2016 to Final Office Action dated Nov. 18, 2015", 12 pgs.
"U.S. Appl. No. 14/215,776, Response filed Sep. 9, 2015 to Non Final Office Action dated May 11, 2015", 6 pgs.
"U.S. Appl. No. 15/225,232, Advisory Action dated Feb. 13, 2018", 3 pgs.
"U.S. Appl. No. 15/225,232, Final Office Action dated Aug. 7, 2018", 6 pgs.
"U.S. Appl. No. 15/225,232, Final Office Action dated Dec. 1, 2017", 5 pgs.
"U.S. Appl. No. 15/225,232, Non Final Office Action dated Apr. 6, 2018", 4 pgs.
"U.S. Appl. No. 15/225,232, Non Final Office Action dated Jul. 28, 2017", 7 pgs.
"U.S. Appl. No. 15/225,232, Notice of Allowance dated Oct. 29, 2018", 8 pgs.
"U.S. Appl. No. 15/225,232, Response filed Feb. 1, 2018 to Final Office Action dated Dec. 1, 2017", 8 pgs.
"U.S. Appl. No. 15/225,232, Response filed Mar. 1, 2018 to Advisory Action dated Feb. 13, 2018", 7 pgs.
"U.S. Appl. No. 15/225,232, Response Filed Jul. 3, 2018 to Non Final Office Action dated Apr. 6, 2018", 7 pgs.
"U.S. Appl. No. 15/225,232, Response filed Oct. 8, 2018 to Final Office Action dated Aug. 7, 2018", 7 pgs.
"U.S. Appl. No. 15/225,232, Response filed Oct. 30, 2017 to Non Final Office Action dated Jul. 28, 2017", 8 pgs.
"U.S. Appl. No. 16/249,370, Preliminary Amendment filed Jan. 16, 2019", 3 pgs.
"U.S. Appl. No. 16/249,370, Supplemental Preliminary Amendment filed Feb. 27, 2019", 5 pgs.
"U.S. Appl. No. 12/712,380, Non Final Office Action dated Sep. 19, 2012", 9 pgs.
"U.S. Appl. No. 12/712,380, Notice of Allowance dated Jan. 11, 2013", 5 pgs.
"U.S. Appl. No. 12/712,380, Response filed Jul. 2, 2012 to Restriction Requirement dated Jun. 7, 2012", 1.
"U.S. Appl. No. 12/712,380, Response filed Oct. 24, 2012 to Non Final Office Action dated Sep. 19, 2012", 10 pgs.
"U.S. Appl. No. 12/712,380, Restriction Requirement dated Jun. 7, 2012", 6 pgs.
"Inter Partes Review of U.S. Pat. No. 8,445,104, IPR2019-0119, *Iconex, LLC* v. *MAXStick Products, Ltd*, Petitioner's Exhibit 1002—File History for U.S. Appl. No. 11/798,975, filed May 18, 2007", (filed May 22, 2019), 333 pgs.
"Inter Partes Review of U.S. Pat. No. 8,445,104, IPR2019-0119, *Iconex, LLC* v. *MAXStick Products, Ltd.*, Motion to Correct Clerical Errors", (Oct. 3, 2019), 82 pgs.
"Inter Partes Review of U.S. Pat. No. 8,445,104, IPR2019-0119, *Iconex, LLC* v. *MAXStick Products, Ltd.*, Notce of Filing Date Accorded to Petition mailed Jun. 11, 2019", 5 pgs.
"Inter Partes Review of U.S. Pat. No. 8,445,104, IPR2019-0119, *Iconex, LLC* v. *MAXStick Products, Ltd.*, Patent Owner's Combined Motion for Entry of Stipulated Protective Order and Motion to Seal dated Sep. 11, 2019", 9 pgs.
"Inter Partes Review of U.S. Pat. No. 8,445,104, IPR2019-0119, *Iconex, LLC* v. *MAXStick Products, Ltd.*, Patent Owner's Exhibit 2001—Declaration of Thomas Downs dated Sep. 9, 2019", (filed Sep. 11, 2019), 4 pgs.
"Inter Partes Review of U.S. Pat. No. 8,445,104, IPR2019-0119, *Iconex, LLC* v. *MAXStick Products, Ltd.*, Patent Owner's Exhibit 2004—Photograph of label product with adhesive patches", (filed Sep. 11, 2019), 1 pgs.
"Inter Partes Review of U.S. Pat. No. 8,445,104, IPR2019-0119, *Iconex, LLC* v. *MAXStick Products, Ltd.*, Patent Owner's Exhibit 2005—U.S. Pat. No. 7,588,811, issued Sep. 15, 2009", (filed Sep. 11, 2019), 12 pgs.
"Inter Partes Review of U.S. Pat. No. 8,445,104, IPR2019-0119, *Iconex, LLC* v. *MAXStick Products, Ltd.*, Patent Owner's Exhibit 2006—Photograph of Epson TM L90 Printer", (filed Sep. 11, 2019), 1 pg.
"Inter Partes Review of U.S. Pat. No. 8,445,104, IPR2019-0119, *Iconex, LLC* v. *MAXStick Products, Ltd.*, Patent Owner's Exhibit 2007—Photograph of POS System", (filed Sep. 11, 2019), 1 pg.
"Inter Partes Review of U.S. Pat. No. 8,445,104, IPR2019-0119, *Iconex, LLC* v. *MAXStick Products, Ltd.*, Patent Owner's Exhibit 2008—Photograph of Espon TM88 Printer", (Sep. 11, 2019), 1 pg.
"Inter Partes Review of U.S. Pat. No. 8,445,104, IPR2019-0119, *Iconex, LLC* v. *MAXStick Products, Ltd.*, Patent Owner's Exhibit 2009—Comparision of the prior art index mark label media and MAXStick Products", (filed Sep. 11, 2019), 1 pg.
"Inter Partes Review of U.S. Pat. No. 8,445,104, IPR2019-0119, *Iconex, LLC* v. *MAXStick Products, Ltd.*, Patent Owner's Exhibit 2010—Managing the Concerns of BPA published Feb. 1, 2009 in ASI Adhsives & Sealants", (filed Sep. 11, 2019), 6 pgs.
"Inter Partes Review of U.S. Pat. No. 8,445,104, IPR2019-0119, *Iconex, LLC* v. *MAXStick Products, Ltd.*, Patent Owner's Exhibit 2013—Presentation entitled "The World's First Removable and Repositionable Liner Free Label"", (filed Sep. 11, 2019), 12 pgs.

(56) References Cited

OTHER PUBLICATIONS

"Inter Partes Review of U.S. Pat. No. 8,445,104, IPR2019-0119, *Iconex, LLC* v. *MAXStick Products, Ltd.*, Patent Owner's Exhibit 2014—White Paper entitled "Liner-free Thermal Labels"", (filed Sep. 11, 2019), 9 pgs.
"Inter Partes Review of U.S. Pat. No. 8,445,104, IPR2019-0119, *Iconex, LLC* v. *MAXStick Products, Ltd.*, Patent Owner's Exhibit 2015—Presentation entitled "Liner Free Adhesive" dated Nov. 19, 2013", (filed Sep. 11, 2019), 27 pgs.
"Inter Partes Review of U.S. Pat. No. 8,445,104, IPR2019-0119, *Iconex, LLC* v. *MAXStick Products, Ltd.*, Patent Owner's Exhibit 2017—E-Mail dated Feb. 1, 2013 from Kevin Brown to Mike Vigunas re: MAXStick Patent Testimonal (Redacted)", (Sep. 11, 2019), 1 pg.
"Inter Partes Review of U.S. Pat. No. 8,445,104, IPR2019-0119, *Iconex, LLC* v. *MAXStick Products, Ltd.*, Patent Owner's Exhibit 2018—E-Mail dated Oct. 22, 2007 from Mark Siedschlag to Robert E. Green re: MAXStick", 2 pgs.
"Inter Partes Review of U.S. Pat. No. 8,445,104, IPR2019-0119, *Iconex, LLC* v. *MAXStick Products, Ltd.*, Patent Owner's Exhibit 2020—Article entitled "Solutions Provider Reaps Profits From Customized Label Solutions", published 2012", 1 pgs.
"Inter Partes Review of U.S. Pat. No. 8,445,104, IPR2019-0119, *Iconex, LLC* v. *MAXStick Products, Ltd.*, Patent Owner's Exhibit 2021—OKI Data Press Release "OKI Data Introduces New Liner-free, Repositionable Direct Thermal Receipt Printer to its Expanding Point-Of-Sale Portfolio" May 7, 2013", (filed Sep. 11, 2019), 2 pgs.
"Inter Partes Review of U.S. Pat. No. 8,445,104, IPR2019-0119, *Iconex, LLC* v. *MAXStick Products, Ltd.*, Patent Owner's Exhibit 2022—Letter dated Feb. 11, 2015 re: MAXStick", (filed Sep. 11, 2019), 1 pg.
"Inter Partes Review of U.S. Pat. No. 8,445,104, IPR2019-0119, *Iconex, LLC* v. *MAXStick Products, Ltd.*, Patent Owner's Exhibit 2023—Axiohm Press Release "Axiohm certifies MAXStick first repositionable thermal label to work with its ASTERON panel mout printer, opening the doors to new applications fortheir printers in medical and test & measurements applications" dated Dec. 10, 2008", (filed Sep. 11, 2019), 2 pgs.
Inter Partes Review of U.S. Pat. No. 8,445,104, IPR2019-0119, *Iconex, LLC* v. *MAXStick Products, Ltd.*, Patent Owner's Exhibit 2024—MAXStick Products' Press Release "MAXStick Products, Ltd. and BIXOLON annouce certification of SPP-R200II with MAXStick Liner-Free Labels", dated Jul. 28, 2014, (filed Sep. 11, 2019), 1 pg.
Inter Partes Review of U.S. Pat. No. 8,445,104, IPR2019-0119, *Iconex, LLC* v. *MAXStick Products, Ltd.*, Patent Owner's Exhibit 2025—MAX Internation Converters Press Release "MAXStick® Products announces certification on Cubinote Printer dated Jun. 22, 2018", (filed Sep. 11, 2019), 2 pgs.
Inter Partes Review of U.S. Pat. No. 8,445,104, IPR2019-0119, *Iconex, LLC* v. *MAXStick Products, Ltd.*, Patent Owner's Exhibit 2026—MAXStick Products' Press Release "MAXStick® Products' Press Release "MAXStick® certified by Hwasung Systems for the new HP-500", printer" dated Oct. 10, 2018, (filed Sep. 11, 2019), 1 pg.
Inter Partes Review of U.S. Pat. No. 8,445,104, IPR2019-0119, *Iconex, LLC* v. *MAXStick Products, Ltd.*, Patent Owner's Exhibit 2027—MAXStick Products' Press Release "MAXStick2GO Receives Certification from Seiko Epson Corporation dated Jun. 30, 2013", (Sep. 11, 2019), 1 pg.
Inter Partes Review of U.S. Pat. No. 8,445,104, IPR2019-0119, *Iconex, LLC* v. *MAXStick Products, Ltd.*, Patent Owner's Exhibit 2028—MAXStick® Products' Press Release "Star Micronics debuts SM-I300 MAXStick Mobile Printer dated Jun. 15, 2017", (Sep. 11, 2019), 1 pg.
Inter Partes Review of U.S. Pat. No. 8,445,104, IPR2019-0119, *Iconex, LLC* v. *MAXStick Products, Ltd.*, Patent Owner's Exhibit 2029—MAXStick International's Press Release "Star Micronics recommends MAXStick for use with their TSP650 thermal printer", (filed Sep. 11, 2019), 1 pg.
"Inter Partes Review of U.S. Pat. No. 8,445,104, IPR2019-0119, *Iconex, LLC* v. *MAXStick Products, Ltd.*, Patent Owner's Exhibit 2032—Document entitled "Epson Labeling Solutions"", (filed Sep. 11, 2019), 2 pgs.
Inter Partes Review of U.S. Pat. No. 8,445,104, IPR2019-0119, *Iconex, LLC* v. *MAXStick Products, Ltd.*, Patent Owner's Exhibit 2033—Epson(r)'s Press Release "Epson Adds Two MAXStick Media Solutions to Its List of Tested Media for TM-L90 PLUS LFC Thermal Label Printers" dated Oct. 3, 2016, (filed Sep. 11, 2019), 3 pgs.
"Inter Partes Review of U.S. Pat. No. 8,445,104, IPR2019-0119, *Iconex, LLC* v. *MAXStick Products, Ltd.*, Patent Owner's Exhibit 2034—EPSON Annouces TM-T88IV Restick Line-Free Label Printer for Quick Service and Casual Dining Restaurants dated Apr. 16, 2008", (filed Sep. 11, 2019), 4 pgs.
Inter Partes Review of U.S. Pat. No. 8,445,104, IPR2019-0119, *Iconex, LLC* v. *MAXStick Products, Ltd.*, Patent Owner's Exhibit 2035—MAXStick Products' Press Release "MAXStick Products Ltd. and Martel Instruments annouce new MAXStick Liner-Free Label Printer", dated May 23, 2014, (filed Sep. 11, 2019), 1 pg.
"Inter Partes Review of U.S. Pat. No. 8,445,104, IPR2019-0119, *Iconex, LLC* v. *MAXStick Products, Ltd.*, Patent Owner's Exhibit 2036—Letter dated Feb. 18, 2013 from Thomas Niedzwiecki of NETS Products Group", (filed Sep. 11, 2019), 1 pg.
Inter Partes Review of U.S. Pat. No. 8,445,104, IPR2019-0119, *Iconex, LLC* v. *MAXStick Products, Ltd.*, Patent Owner's Exhibit 2037—NETS Products Advertisement entield "Made to Order. . . Made to Stick", (filed Sep. 11, 2019), 1 pg.
"Inter Partes Review of U.S. Pat. No. 8,445,104, IPR2019-0119, *Iconex, LLC* v. *MAXStick Products, Ltd.*, Patent Owner's Exhibit 2038—Letter dated Feb. 15, 2013 from Samer Khashan, Pres. of Team One Repair re: MAXStick International Products", (filed Sep. 11, 2019), 1 pg.
"Inter Partes Review of U.S. Pat. No. 8,445,104, IPR2019-0119, *Iconex, LLC* v. *MAXStick Products, Ltd.*, Patent Owner's Exhibit 2039—Letter dated Apr. 10, 2013 from Andreas Eissing of McDonalds Germany Inc. to Mike Vigunas", (filed Sep. 11, 2019), 1 pg.
"Inter Partes Review of U.S. Pat. No. 8,445,104, IPR2019-0119, *Iconex, LLC* v. *MAXStick Products, Ltd.*, Patent Owner's Exhibit 2040—US 2014/0148542A1, published May 29, 2014", (filed Sep. 11, 2019), 4 pgs.
"Inter Partes Review of U.S. Pat. No. 8,445,104, IPR2019-0119, *Iconex, LLC* v. *MAXStick Products, Ltd.*, Patent Owner's Exhibit 2041—Exhit B—Stipulated Protective Order", (filed Sep. 11, 2019), 9 pgs.
"Inter Partes Review of U.S. Pat. No. 8,445,104, IPR2019-0119, *Iconex, LLC* v. *MAXStick Products, Ltd.*, Patent Owner's Exhibit 2042—Exhibt B—Stipulated Protect Order", (filed Sep. 11, 2019), 9 pgs.
"Inter Partes Review of U.S. Pat. No. 8,445,104, IPR2019-0119, *Iconex, LLC* v. *MAXStick Products, Ltd.*, Patent Owner's Notices Under 37 C.F.R. Sec. 42.8 dated Jun. 12, 2019", 5 pgs.
"Inter Partes Review of U.S. Pat. No. 8,445,104, IPR2019-0119, *Iconex, LLC* v. *MAXStick Products, Ltd.*, Petition for Inter-Partes Review dated May 22, 2019", 76 pgs.
"Inter Partes Review of U.S. Pat. No. 8,445,104, IPR2019-0119, *Iconex, LLC* v. *MAXStick Products, Ltd.*, Petitioner's Exhibit 1001—U.S. Pat. No. 8,445,104, issued May 21, 2013", (filed May 22, 2019), 14 pgs.
"Inter Partes Review of U.S. Pat. No. 8,445,104, IPR2019-0119, *Iconex, LLC* v. *MAXStick Products, Ltd.*, Petitioner's Exhibit 1003—Declaration of Dr. Anthony McHugh dated May 21, 2019", (filed May 22, 2019), 62 pgs.
"Inter Partes Review of U.S. Pat. No. 8,445,104, IPR2019-0119, *Iconex, LLC* v. *MAXStick Products, Ltd.*, Petitioner's Exhibit 1004—U.S. Pat. No. 6,432,528, published Aug. 13, 2002", (Filed May 22, 2019), 15 pgs.
"Inter Partes Review of U.S. Pat. No. 8,445,104, IPR2019-0119, *Iconex, LLC* v. *MAXStick Products, Ltd.*, Petitioner's Exhibit 1005—US 2004/0250947A1, published Dec. 16, 2004", 23 pgs.

(56) References Cited

OTHER PUBLICATIONS

"Inter Partes Review of U.S. Pat. No. 8,445,104, IPR2019-0119, *Iconex, LLC* v. *MAXStick Products, Ltd.*, Petitioner's Exhibit 1006—U.S. Pat. No. 5,354,588, published Oct. 11, 1994", (filed May 22, 2019), 5 pgs.

"Inter Partes Review of U.S. Pat. No. 8,537,184, IPR2019-01542, *MAXStick Products, Ltd.* v. *Iconex, LLC*, Notice of Filing Date Accorded to Petition and Time for Filing Patent Owner Preliminary Response", (Sep. 23, 2019), 5 pgs.

"Inter Partes Review of U.S. Pat. No. 8,537,184, IPR2019-01542, *MAXStick Products, Ltd.* v. *Iconex, LLC*, Patent Owner's Mandatory Notices Pursuant to 37 C.F.R. Sec. 42.8(A)(2)", (Sep. 18, 2019), 4 pgs.

"Inter Partes Review of U.S. Pat. No. 8,537,184, IPR2019-01542, *MAXStick Products, Ltd.* v. *Iconex, LLC*, Patent Owner's Power of Attorney", (Sep. 18, 2019), 4 pgs.

"Inter Partes Review of U.S. Pat. No. 8,537,184, IPR2019-01542, *MAXStick Products, Ltd.* v. *Iconex, LLC*, Petition for Inter Partes Review", (Aug. 23, 2019), 106 pgs.

"Inter Partes Review of U.S. Pat. No. 8,537,184, IPR2019-01542, *MAXStick Products, Ltd.* v. *Iconex, LLC*, Petitioner's Exhibit 1001—U.S. Pat. No. 8,537,184, issued Sep. 17, 2013", (filed Aug. 23, 2019), 18 pgs.

"Inter Partes Review of U.S. Pat. No. 8,537,184, IPR2019-01542, *MAXStick Products, Ltd.* v. *Iconex, LLC*, Petitioner's Exhibit 1002—Prosecution History re: U.S. Pat. No. 8,537,184", (filed Aug. 23, 2019), 154 pgs.

"Inter Partes Review of U.S. Pat. No. 8,537,184, IPR2019-01542, *MAXStick Products, Ltd.* v. *Iconex, LLC*, Petitioner's Exhibit 1003—US 2007/0267146A1, published Nov. 22, 2007", (filed Aug. 23, 2019), 14 pgs.

"Inter Partes Review of U.S. Pat. No. 8,537,184, IPR2019-01542, *MAXStick Products, Ltd.* v. *Iconex, LLC*, Petitioner's Exhibit 1004—Translation of DE202004018325U1, published Apr. 28, 2005", (filed Aug. 23, 2019), 5 pgs.

"Inter Partes Review of U.S. Pat. No. 8,537,184, IPR2019-01542, *MAXStick Products, Ltd.* v. *Iconex, LLC*, Petitioner's Exhibit 1005—U.S. Pat. No. 5,661,099, issued Aug. 26, 1997", (filed Aug. 23, 2019), 6 pgs.

"Inter Partes Review of U.S. Pat. No. 8,537,184, IPR2019-01542, *MAXStick Products, Ltd.* v. *Iconex, LLC*, Petitioner's Exhibit 1006—U.S. Pat. No. 6,585,437, issued Jul. 1, 2003", (filed Aug. 23, 2019), 12 pgs.

"Inter Partes Review of U.S. Pat. No. 8,537,184, IPR2019-01542, *MAXStick Products, Ltd.* v. *Iconex, LLC*, Petitioner's Exhibit 1007—US 2006/0216451A1, published Sep. 28, 2006", (filed Aug. 23, 2019), 9 pgs.

"Inter Partes Review of U.S. Pat. No. 8,537,184, IPR2019-01542, *MAXStick Products, Ltd.* v. *Iconex, LLC*, Petitioner's Exhibit 1008—US 2010/0015374A1, published Jan. 21, 2010", (filed Aug. 23, 2019), 9 pgs.

"Inter Partes Review of U.S. Pat. No. 8,537,184, IPR2019-01542, *MAXStick Products, Ltd.* v. *Iconex, LLC*, Petitioner's Exhibit 1009—U.S. Pat. No. 7,742,366, issued Jun. 22, 2010", (filed Aug. 23, 2019), 19 pgs.

"Inter Partes Review of U.S. Pat. No. 8,537,184, IPR2019-01542, *MAXStick Products, Ltd.* v. *Iconex, LLC*, Petitioner's Exhibit 1010—U.S. Pat. No. 5,591,290, issued Jan. 7, 1997", (filed Aug. 23, 2019), 9 pgs.

"Inter Partes Review of U.S. Pat. No. 8,537,184, IPR2019-01542, *MAXStick Products, Ltd.* v. *Iconex, LLC*, Petitioner's Exhibit 1011—BLANK", (filed Aug. 23, 2019), 1 pg.

"Inter Partes Review of U.S. Pat. No. 8,537,184, IPR2019-01542, *MAXStick Products, Ltd.* v. *Iconex, LLC*, Petitioner's Exhibit 1011—Prosecution History of U.S. Appl. No. 12/174,156", (filed Aug. 23, 2019), 388 pgs.

"Inter Partes Review of U.S. Pat. No. 8,537,184, IPR2019-01542, *MAXStick Products, Ltd.* v. *Iconex, LLC*, Petitioner's Exhibit 1012—U.S. Pat. No. 8,389,080, issued Mar. 5, 2013", (filed Aug. 23, 2019), 11 pgs.

"Inter Partes Review of U.S. Pat. No. 8,537,184, IPR2019-01542, *MAXStick Products, Ltd.* v. *Iconex, LLC*, Petitioner's Exhibit 1013—U.S. Pat. No. 7,588,811, issued Sep. 15, 2009", (filed Aug. 23, 2019), 12 pgs.

"Inter Partes Review of U.S. Pat. No. 8,537,184, IPR2019-01542, *MAXStick Products, Ltd.* v. *Iconex, LLC*, Petitioner's Exhibit 1014—Not Used", (filed Aug. 23, 2019), 1 pg.

"Inter Partes Review of U.S. Pat. No. 8,537,184, IPR2019-01542, *MAXStick Products, Ltd.* v. *Iconex, LLC*, Petitioner's Exhibit 1015—BLANK", (filed Aug. 23, 2019), 1 pg.

"Inter Partes Review of U.S. Pat. No. 8,537,184, IPR2019-01542, *MAXStick Products, Ltd.* v. *Iconex, LLC*, Petitioner's Exhibit 1015—U.S. Pat. No. 5,782,496, issued Jul. 21, 1998", (filed Aug. 23, 2019), 11 pgs.

"Inter Partes Review of U.S. Pat. No. 8,537,184, IPR2019-01542, *MAXStick Products, Ltd.* v. *Iconex, LLC*, Petitioner's Exhibit 1016—BLANK", (filed Aug. 23, 2019), 1 pg.

"Inter Partes Review of U.S. Pat. No. 8,537,184, IPR2019-01542, *MAXStick Products, Ltd.* v. *Iconex, LLC*, Petitioner's Exhibit 1016—U.S. Pat. No. 5,840,657, issued Nov. 24, 1998", (filed Aug. 23, 2019), 11 pgs.

"Inter Partes Review of U.S. Pat. No. 8,537,184, IPR2019-01542, *MAXStick Products, Ltd.* v. *Iconex, LLC*, Petitioner's Exhibit 1017—U.S. Pat. No. 5,292,713, issued Mar. 8, 1994", (filed Aug. 23, 2019), 6 pgs.

"Inter Partes Review of U.S. Pat. No. 8,537,184, IPR2019-01542, *MAXStick Products, Ltd.* v. *Iconex, LLC*, Petitioner's Exhibit 1018—US 2005/0255298A1, published Nov. 17, 2005", (Aug. 23, 2019), 14 pgs.

"Inter Partes Review of U.S. Pat. No. 8,537,184, IPR2019-01542, *MAXStick Products, Ltd.* v. *Iconex, LLC*, Petitioner's Exhibit 1019—BLANK", (filed Aug. 23, 2019), 1 pg.

"Inter Partes Review of U.S. Pat. No. 8,537,184, IPR2019-01542, *MAXStick Products, Ltd.* v. *Iconex, LLC*, Petitioner's Exhibit 1019—U.S. Pat. No. 3,991,708, issued Nov. 16, 1976", (filed Aug. 23, 2019), 4 pgs.

"Inter Partes Review of U.S. Pat. No. 8,537,184, IPR2019-01542, *MAXStick Products, Ltd.* v. *Iconex, LLC*, Petitioner's Exhibit 1020—US 2008/0223512A1, published Sep. 18, 2008", (filed Aug. 23, 2019), 10 pgs.

"Inter Partes Review of U.S. Pat. No. 8,537,184, IPR2019-01542, *MAXStick Products, Ltd.* v. *Iconex, LLC*, Petitioner's Exhibit 1021—US 2006/0134365A1, published Jun. 22, 2006", (filed Aug. 23, 2019), 12 pgs.

"Inter Partes Review of U.S. Pat. No. 8,537,184, IPR2019-01542, *MAXStick Products, Ltd.* v. *Iconex, LLC*, Petitioner's Exhibit 1022—Translator's Declaration re: DE202004018325 dated Aug. 23, 2019", (filed Aug. 23, 2019), 6 pgs.

"Inter Partes Review of U.S. Pat. No. 8,537,184, IPR2019-01542, *MAXStick Products, Ltd.* v. *Iconex, LLC*, Petitioner's Exhibit 1023—DE 202004018325U1, published Apr. 28, 2005", (filed Aug. 23, 2019), 5 pgs.

"Inter Partes Review of U.S. Pat. No. 8,537,184, IPR2019-01542, *MAXStick Products, Ltd.* v. *Iconex, LLC*, Petitioner's Exhibit 1024—BLANK", (filed Aug. 23, 2019), 1 pg.

"Inter Partes Review of U.S. Pat. No. 8,537,184, IPR2019-01542, *MAXStick Products, Ltd.* v. *Iconex, LLC*, Petitioner's Exhibit 1024—Order Constuing the Terms of U.S. Pat. No. 7,588,811; U.S. Pat. No. 7,820,264; U.S. Pat. No. 8,537,194; and U.S. Pat. No. 8,711,190", (filed Aug. 23. 2019), 11 pgs.

"Inter Partes Review of U.S. Pat. No. 8,537,184, IPR2019-01542, *MAXStick Products, Ltd.* v. *Iconex, LLC*, Petitioner's Exhibit 1025—BLANK", (filed Aug. 23, 2019), 1 pg.

"Inter Partes Review of U.S. Pat. No. 8,537,184, IPR2019-01542, *MAXStick Products, Ltd.* v. *Iconex, LLC*, Petitioner's Exhibit 1025—Prosecution History of U.S. Appl. No. 13/858,527", (filed Aug. 23, 2019), 214 pgs.

"Inter Partes Review of U.S. Pat. No. 8,537,184, IPR2019-01542, *MAXStick Products, Ltd.* v. *Iconex, LLC*, Petitioner's Exhibit 1026—BLANK", (filed Aug. 23, 2019), 1 pg.

(56) References Cited

OTHER PUBLICATIONS

"Inter Partes Review of U.S. Pat. No. 8,537,184, IPR2019-01542, *MAXStick Products, Ltd.* v. *Iconex, LLC*, Petitioner's Exhibit 1026—http://www.maxstick.com for MAXStick, archived on Jul. 5, 2009", (filed Aug. 23, 2019), 1 pg.

"Inter Partes Review of U.S. Pat. No. 8,537,184, IPR2019-01542, *MAXStick Products, Ltd.* v. *Iconex, LLC*, Petitioner's Exhibit 1027—Declaration of William Krahl dated Aug. 22, 2019", (filed Aug. 23, 2019), 8 pgs.

"Inter Partes Review of U.S. Pat. No. 8,537,184, IPR2019-01542, *MAXStick Products, Ltd.* v. *Iconex, LLC*, Petitioner's Power of Attorney", (Aug. 23, 2019), 2 pgs.

"Inter Partes Review of U.S. Pat. No. 9,646,517, IPR2019-01122, *Iconex, LLC* v. *MAXStick Products, Ltd*, Petition for Inter Partes Review", (filed May 22, 2019), 85 pgs.

"Inter Partes Review of U.S. Pat. No. 9,646,517, IPR2019-01122, *Iconex, LLC* v. *MAXStick Products, Ltd*, Petitioner's Exhibit 1001—U.S. Pat. No. 9,646,517, issued May 9, 2017", (filed May 22, 2019), 14 pgs.

"Inter Partes Review of U.S. Pat. No. 9,646,517, IPR2019-01122, *Iconex, LLC* v. *MAXStick Products, Ltd*, Petitioner's Exhibit 1002—Prosecution History of the '517 Patent", (filed May 22, 2019), 138 pgs.

"Inter Partes Review of U.S. Pat. No. 9,646,517, IPR2019-01122, *Iconex, LLC* v. *MAXStick Products, Ltd*, Petitioner's Exhibit 1003—Declaration of Dr. Anthony McHugh dated May 21, 2019", (filed May 22, 2019), 62 pgs.

"Inter Partes Review of U.S. Pat. No. 9,646,517, IPR2019-01122, *Iconex, LLC* v. *MAXStick Products, Ltd*, Petitioner's Exhibit 1004—U.S. Pat. No. 6,432,528, issued Aug. 13, 2002", (filed May 22, 2019), 15 pgs.

"Inter Partes Review of U.S. Pat. No. 9,646,517, IPR2019-01122, *Iconex, LLC* v. *MAXStick Products, Ltd*, Petitioner's Exhibit 1005—US 2004/0250947A1, published Dec. 16, 2004", (filed May 22, 2019), 23 pgs.

"Inter Partes Review of U.S. Pat. No. 9,646,517, IPR2019-01122, *Iconex, LLC* v. *MAXStick Products, Ltd*, Petitioner's Exhibit 1006—U.S. Pat. No. 5,354,588, issued Oct. 11, 1994", (filed May 22, 2019), 5 pgs.

"Inter Partes Review of U.S. Pat. No. 9,646,517, IPR2019-01122, *Iconex, LLC* v. *MAXStick Products, Ltd*, Petitioner's Exhibit 1007—U.S. Pat. No. 5,840,657, issued Nov. 24, 1998", (filed May 22, 2019), 11 pgs.

"Inter Partes Review of U.S. Pat. No. 9,646,517, IPR2019-01122, *Iconex, LLC* v. *MAXStick Products, Ltd*, Petitioner's Exhibit 1008—U.S. Pat. No. 3,051,588", (filed May 22, 2019), 4 pgs.

"Inter Partes Review of U.S. Pat. No. 9,646,517, IPR2019-01122, *Iconex, LLC* v. *MAXStick Products, Ltd*, Petitioner's Exhibit 1009—U.S. Pat. No. 6,099,943, issued Aug. 8, 2000", (filed May 22, 2019), 5 pgs.

"Inter Partes Review of U.S. Pat. No. 9,646,517, IPR2019-01122, *Iconex, LLC* v. *MAXStick Products, Ltd*, Petitioner's Exhibit 1010—DE 20216483U1, published May 15, 2003", (filed May 22, 2019), 11 pgs.

"Inter Partes Review of U.S. Pat. No. 9,646,517, IPR2019-01122, *Iconex, LLC* v. *MAXStick Products, Ltd*, Petitioner's Exhibit 1011—U.S. Pat. No. 5,945,468, issued Aug. 31, 1999", (filed May 22, 2019), 5 pgs.

"Inter Partes Review of U.S. Pat. No. 9,646,517, IPR2019-01122, *Iconex, LLC* v. *MAXStick Products, Ltd*, Petitioner's Exhibit 1012—U.S. Pat. No. 5,661,099, issued Aug. 26, 1997", (filed May 22, 2019), 6 pgs.

"Inter Partes Review of U.S. Pat. No. 9,646,517, IPR2019-01122, *Iconex, LLC* v. *MAXStick Products, Ltd*, Petitioner's Exhibit 1013—WO 98/14377A1, published Apr. 9, 1998", (filed May 22, 2019), 37 pgs.

"Inter Partes Review of U.S. Pat. No. 9,646,517, IPR2019-01122, *Iconex, LLC* v. *MAXStick Products, Ltd*, Petitioner's Exhibit 1014—U.S. Pat. No. 5,292,713, issued Mar. 8, 1994", (filed May 22, 2019), 6 pgs.

"Inter Partes Review of U.S. Pat. No. 9,646,517, IPR2019-01122, *Iconex, LLC* v. *MAXStick Products, Ltd*, Petitioner's Exhibit 1015—U.S. Pat. No. 4,870,047, issued Sep. 26, 1989", (filed May 22, 2019), 15 pgs.

"Inter Partes Review of U.S. Pat. No. 9,646,517, IPR2019-01122, *Iconex, LLC* v. *MAXStick Products, Ltd*, Petitioner's Exhibit 1016—U.S. Pat. No. 5,656,705, issued Aug. 12, 1997", (filed May 22, 2019), 9 pgs.

"Inter Partes Review of U.S. Pat. No. 9,646,517, IPR2019-01122, *Iconex, LLC* v. *MAXStick Products, Ltd*, Petitioner's Exhibit 1017—U.S. Pat. No. 6,830,795, issued Dec. 14, 2004", (filed May 22, 2019), 12 pgs.

"Inter Partes Review of U.S. Pat. No. 9,646,517, IPR2019-01122, *Iconex, LLC* v. *MAXStick Products, Ltd*, Petitioner's Exhibit 1018—U.S. Pat. No. 6,129,965, issued Oct. 10, 2000", (filed May 22, 2019), 7 pgs.

"Inter Partes Review of U.S. Pat. No. 9,646,517, IPR2019-01122, *Iconex, LLC* v. *MAXStick Products, Ltd*, Petitioner's Exhibit 1019—U.S. Pat. No. 6,268,032, issued Jul. 31, 2001", (filed May 22, 2019), 32 pgs.

"Inter Partes Review of U.S. Pat. No. 9,646,517, IPR2019-01122, *Iconex, LLC* v. *MAXStick Products, Ltd*, Petitioner's Exhibit 1020—Translation of DE 202004018325U1", (filed May 22, 2019), 5 pgs.

"Inter Partes Review of U.S. Pat. No. 9,646,517, IPR2019-01122, *Iconex, LLC* v. *MAXStick Products, Ltd*, Petitioner's Exhibit 1021—U.S. Pat. No. 5,194,329, issued Mar. 16, 1993", (filed May 22, 2019), 4 pgs.

"Inter Partes Review of U.S. Pat. No. 9,646,517, IPR2019-01122, *Iconex, LLC* v. *MAXStick Products, Ltd*, Petitioner's Exhibit 1022—Certification for Translation of DE20216483U1", (filed May 22, 2019), 2 pgs.

"Inter Partes Review of U.S. Pat. No. 9,646,517, IPR2019-01122, *Iconex, LLC* v. *MAXStick Products, Ltd*, Petitioner's Exhibit 1023—US 2005/0208250A1, published Sep. 22, 2005", (filed May 22, 2019), 11 pgs.

"Inter Partes Review of U.S. Pat. No. 9,646,517, IPR2019-01122, *Iconex, LLC* v. *MAXStick Products, Ltd*, Petitioner's Exhibit 1024—U.S. Pat. No. 3,691,140, issued Sep. 12, 1972", (filed May 22, 2019), 7 pgs.

"Inter Partes Review of U.S. Pat. No. 9,646,517, IPR2019-01122, *Iconex, LLC* v. *MAXStick Products, Ltd*, Petitioner's Exhibit 1025—U.S. Pat. No. 5,314,929, issued May 24, 1994", (filed May 22, 2019), 5 pgs.

"Inter Partes Review of U.S. Pat. No. 9,646,517, IPR2019-01122, *Iconex, LLC* v. *MAXStick Products, Ltd*, Petitioner's Exhibit 1026—Prosecution History of U.S. Pat. No. 8,445,104", (filed May 22, 2019), 333 pgs.

"Inter Partes Review of U.S. Pat. No. 9,646,517, IPR2019-01122, *Iconex, LLC* v. *MAXStick Products, Ltd*, Petitioner's Exhibit 1027—Complaint dated Sep. 12, 2018 in *MAX International Converters, Inc., et al.* v. *Iconex LLC* (USDC for the District of Delaware)", (filed May 22, 2019), 74 pgs.

"Inter Partes Review of U.S. Pat. No. 9,646,517, IPR2019-01122, *Iconex, LLC* v. *MAXStick Products, Ltd*, Petitioner's Exhibit 1028—DE 20216483U1, published May 15, 2003", (filed May 22, 2019), 11 pgs.

"Inter Partes Review of U.S. Pat. No. 9,646,517, IPR2019-01122, *Iconex, LLC* v. *MAXStick Products, Ltd*, Petitioner's Exhibit 1029—DE 202004018325U1, published Apr. 28, 2005", (filed May 22, 2019), 5 pgs.

"Inter Partes Review of U.S. Pat. No. 9,646,517, IPR2019-01122, *Iconex, LLC* v. *MAXStick Products, Ltd*, Petitioner's Power of Attorney", (filed May 22, 2019), 3 pgs.

"Inter Partes Review of U.S. Pat. No. 9,646,517, IPR2019-01122, *Iconex, LLC* v. *MAXStick Products, Ltd.*, Notice of Filing Date Accorded to Petition and Time for filing Patent Owner Preliminary Response", (Jun. 11, 2019), 5 pgs.

"Inter Partes Review of U.S. Pat. No. 9,646,517, IPR2019-01122, *Iconex, LLC* v. *MAXStick Products, Ltd.*, Patent Owner's Combined Motion for Entry of Stipulated Protective Order and Motion to Seal", (Sep. 11, 2019), 9 pgs.

(56) References Cited

OTHER PUBLICATIONS

"Inter Partes Review of U.S. Pat. No. 9,646,517, IPR2019-01122, *Iconex, LLC* v. *MAXStick Products, Ltd.*, Patent Owner's Exhibit 2001—Declaration of Thomas Downs dated Sep. 9, 2019", (filed Sep. 11, 2019), 4 pgs.

"Inter Partes Review of U.S. Pat. No. 9,646,517, IPR2019-01122, *Iconex, LLC* v. *MAXStick Products, Ltd.*, Patent Owner's Exhibit 2004—Photograph of Label Product with Adhesive Patches", (filed Sep. 11, 2019), 1 pg.

"Inter Partes Review of U.S. Pat. No. 9,646,517, IPR2019-01122, *Iconex, LLC* v. *MAXStick Products, Ltd.*, Patent Owner's Exhibit 2005—U.S. Pat. No. 7,588,811, issued Sep. 15, 2009", (filed Sep. 11, 2019), 12 pgs.

"Inter Partes Review of U.S. Pat. No. 9,646,517, IPR2019-01122, *Iconex, LLC* v. *MAXStick Products, Ltd.*, Patent Owner's Exhibit 2006—Photograph of Epson TML90 Printer", (filed Sep. 11, 2019), 1 pg.

"Inter Partes Review of U.S. Pat. No. 9,646,517, IPR2019-01122, *Iconex, LLC* v. *MAXStick Products, Ltd.*, Patent Owner's Exhibit 2007—Photograph of POS System", (filed Sep. 11, 2019), 1 pg.

"Inter Partes Review of U.S. Pat. No. 9,646,517, IPR2019-01122, *Iconex, LLC* v. *MAXStick Products, Ltd.*, Patent Owner's Exhibit 2008—Photograph of Epson TM88 Printer", (filed Sep. 11, 2019), 1 pg.

"Inter Partes Review of U.S. Pat. No. 9,646,517, IPR2019-01122, *Iconex, LLC* v. *MAXStick Products, Ltd.*, Patent Owner's Exhibit 2009—Comparison of the Prior Art Index Mark Label Media and MAXStick Products", (filed Sep. 11, 2019), 1 pg.

"Inter Partes Review of U.S. Pat. No. 9,646,517, IPR2019-01122, *Iconex, LLC* v. *MAXStick Products, Ltd.*, Patent Owner's Exhibit 2010—Article entiteld "Managing the Concerns of BPA" published Feb. 1, 2009", (filed Sep. 11, 2019), 6 pgs.

Inter Partes Review of U.S. Pat. No. 9,646,517, IPR2019-01122, *Iconex, LLC* v. *MAXStick Products, Ltd.*, Patent Owner's Exhibit 2013—Presentation entitled "The World's First Removable and Repositionable Liner Free Label", (filed Sep. 11, 2019), 12 pgs.

"Inter Partes Review of U.S. Pat. No. 9,646,517, IPR2019-01122, *Iconex, LLC* v. *MAXStick Products, Ltd.*, Patent Owner's Exhibit 2014—White Paper entitled "Liner-free Thermal Labels"", (filed Sep. 11, 2019), 9 pgs.

"Inter Partes Review of U.S. Pat. No. 9,646,517, IPR2019-01122, *Iconex, LLC* v. *MAXStick Products, Ltd.*, Patent Owner's Exhibit 2015—Presentation entitled "Liner Free Adhesive" dated Nov. 19, 2013", (filed Sep. 11, 2019), 27 pgs.

"Inter Partes Review of U.S. Pat. No. 9,646,517, IPR2019-01122, *Iconex, LLC* v. *MAXStick Products, Ltd.*, Patent Owner's Exhibit 2017—E-Mail dated Feb. 1, 2013 from Kevin Brown to Mike Vigunas re: MAXStick Patent Testimonal (Redacted)", (filed Sep. 11, 2019), 1 pg.

"Inter Partes Review of U.S. Pat. No. 9,646,517, IPR2019-01122, *Iconex, LLC* v. *MAXStick Products, Ltd.*, Patent Owner's Exhibit 2018—E-Mail dated Oct. 22, 2007 from Mark Siedschlag to Robert Green, et al. re; MAXStick", (filed Sep. 11, 2019), 2 pgs.

"Inter Partes Review of U.S. Pat. No. 9,646,517, IPR2019-01122, *Iconex, LLC* v. *MAXStick Products, Ltd.*, Patent Owner's Exhibit 2020—Article entitled "Solutions Provider Reaps Profits From Customized Label Solution", published Sep. 2012", (filed Sep. 11, 2019), 1 pg.

Inter Partes Review of U.S. Pat. No. 9,646,517, IPR2019-01122, *Iconex, LLC* v. *MAXStick Products, Ltd.*, Patent Owner's Exhibit 2021—OKI Data's Press Release "OKI Data Americas Introduces New Liner-free, Repositionable Direct Thermal Receipt Printer to its Expanding Point-Of-Sale Portfolio" dated May 7, 2013, (filed Sep. 11, 2019), 2 pgs.

"Inter Partes Review of U.S. Pat. No. 9,646,517, IPR2019-01122, *Iconex, LLC* v. *MAXStick Products, Ltd.*, Patent Owner's Exhibit 2022—Letter dated Feb. 11, 2013 from Barry Jones of Merley Paper Converters Limited", (filed Sep. 11, 2019), 1 pg.

Inter Partes Review of U.S. Pat. No. 9,646,517, IPR2019-01122, *Iconex, LLC* v. *MAXStick Products, Ltd.*, Patent Owner's Exhibit 2023—Axiohm's Press Release "Axiohm certifies MAXStick first repositionable termal label to work with its ASTERON panel mount printer, opening the doors to new applications fortheir printers in medical and test & measurements applications" dated Dec. 10, 2008, (filed Sep. 11, 2019), 2 pgs.

Inter Partes Review of U.S. Pat. No. 9,646,517, IPR2019-01122, *Iconex, LLC* v. *MAXStick Products, Ltd.*, Patent Owner's Exhibit 2024—MAXStick Products' Press Release "MAXStick Products Ltd. and BIXOLON annouce certification of SPP_R200II with MAXStick Liner-Free Labels" dated Jul. 28, 2014, (filed Sep. 11, 2019), 1 pg.

"Inter Partes Review of U.S. Pat. No. 9,646,517, IPR2019-01122, *Iconex, LLC* v. *MAXStick Products, Ltd.*, Patent Owner's Exhibit 2025—MAXStick Products' Press Release "MAXStick(r) Products announces certification on Cubinote Printer" dated Jun. 22, 2018", (filed Sep. 11, 2019), 2 pgs.

"Inter Partes Review of U.S. Pat. No. 9,646,517, IPR2019-01122, *Iconex, LLC* v. *MAXStick Products, Ltd.*, Patent Owner's Exhibit 2026—MAXStick Products' Press Release "MAXStick® certified by Hwasung Systems for the new HP-500 printer" dated Oct. 10, 2018", (filed Sep. 11, 2019), 1 pg.

"Inter Partes Review of U.S. Pat. No. 9,646,517, IPR2019-01122, *Iconex, LLC* v. *MAXStick Products, Ltd.*, Patent Owner's Exhibit 2027—MAXStick Products' Press Release "MAXStick2GO Receives Certification from Seiko Epson Corporation" dated Jun. 30, 2013", (filed Sep. 11, 2019), 1 pg.

"Inter Partes Review of U.S. Pat. No. 9,646,517, IPR2019-01122, *Iconex, LLC* v. *MAXStick Products, Ltd.*, Patent Owner's Exhibit 2028—MAXStick Products' Press Release "Star Micronics debuts SM-L300 MAXStick Mobile Printer" dated Jun. 15, 2017", (filed Sep. 11, 2019), 1 pg.

"Inter Partes Review of U.S. Pat. No. 9,646,517, IPR2019-01122, *Iconex, LLC* v. *MAXStick Products, Ltd.*, Patent Owner's Exhibit 2029—MAXStick Products' Press Release "Star Micronics recommends MAXStick for use with their TSP650 thermal printer" dated Jun. 2008", (filed Sep. 11, 2019), 1 pg.

"Inter Partes Review of U.S. Pat. No. 9,646,517, IPR2019-01122, *Iconex, LLC* v. *MAXStick Products, Ltd.*, Patent Owner's Exhibit 2032—Document entitled "Epson Labeling Solutions"", (filed Sep. 11, 2019), 2 pgs.

"Inter Partes Review of U.S. Pat. No. 9,646,517, IPR2019-01122, *Iconex, LLC* v. *MAXStick Products, Ltd.*, Patent Owner's Exhibit 2033—Epson's Press Release "Epson Adds Two MAXStick Media Solutions to its List of Tested Media for TM-L90 PLUS LFC Thermal Label Printers"", dated Oct. 3, 2016, (filed Sep. 11, 2019), 3 pgs.

Inter Partes Review of U.S. Pat. No. 9,646,517, IPR2019-01122, *Iconex, LLC* v. *MAXStick Products, Ltd.*, Patent Owner's Exhibit 2034—Epson's Draft Press Release "Epson Announces TM-T88IV Restick Liner-Free Label Printer for Quick Service and Casual Dining Restaurants", (filed Sep. 11, 2019), 4 pgs.

"Inter Partes Review of U.S. Pat. No. 9,646,517, IPR2019-01122, *Iconex, LLC* v. *MAXStick Products, Ltd.*, Patent Owner's Exhibit 2035—MAXStick Products' Press Release "MAXStick Products Ltd. and Martel Instruments annouce new MAXStick Liner-Free Label Printer"", dated May 23, 2014, (filed Sep. 11, 2019), 1 pg.

"Inter Partes Review of U.S. Pat. No. 9,646,517, IPR2019-01122, *Iconex, LLC* v. *MAXStick Products, Ltd.*, Patent Owner's Exhibit 2036—Letter dated Feb. 18, 2013 from Thomas Niedzwiecki of NETS Products Group LLC", (filed Sep. 11, 2019), 1 pg.

Inter Partes Review of U.S. Pat. No. 9,646,517, IPR2019-01122, *Iconex, LLC* v. *MAXStick Products, Ltd.*, Patent Owner's Exhibit 2037—NETS Products Group's Advertisement entiteld "Made To Order . . . Made to Stick . . . ", (filed Sep. 11, 2019), 1 pg.

"Inter Partes Review of U.S. Pat. No. 9,646,517, IPR2019-01122, *Iconex, LLC* v. *MAXStick Products, Ltd.*, Patent Owner's Exhibit 2038—Letter dated Feb. 15, 2013 from Samar Khashan of Team One Repair, Inc. re: MAXStick Products", (filed Sep. 11, 2019), 1 pg.

"Inter Partes Review of U.S. Pat. No. 9,646,517, IPR2019-01122, *Iconex, LLC* v. *MAXStick Products, Ltd.*, Patent Owner's Exhibit 2039—Letter dated Apr. 10, 2013 from Andreas Eissing to Mike Vigunas", (filed Sep. 11, 2019), 1 pg.

(56) References Cited

OTHER PUBLICATIONS

"Inter Partes Review of U.S. Pat. No. 9,646,517, IPR2019-01122, *Iconex, LLC* v. *MAXStick Products, Ltd.*, Patent Owner's Exhibit 2040—Not Used", (filed Sep. 11, 2019), 1 pg.
"Inter Partes Review of U.S. Pat. No. 9,646,517, IPR2019-01122, *Iconex, LLC* v. *MAXStick Products, Ltd.*, Patent Owner's Exhibit 2041—U.S. Pat. No. 8,445,104, issued May 21, 2013", (filed Sep. 11, 2019), 14 pgs.
"Inter Partes Review of U.S. Pat. No. 9,646,517, IPR2019-01122, *Iconex, LLC* v. *MAXStick Products, Ltd.*, Patent Owner's Exhibit 2042—U.S. Pat. No. 8,537,184, issued Sep. 17, 2013", (filed Sep. 11, 2019), 18 pgs.
"Inter Partes Review of U.S. Pat. No. 9,646,517, IPR2019-01122, *Iconex, LLC* v. *MAXStick Products, Ltd.*, Patent Owner's Exhibit 2043—Not Used", (filed Sep. 11, 2019), 1 pg.
"Inter Partes Review of U.S. Pat. No. 9,646,517, IPR2019-01122, *Iconex, LLC* v. *MAXStick Products, Ltd.*, Patent Owner's Exhibit 2044—Prosecution History of U.S. Pat. No. 9,208,699", (filed Sep. 11, 2019), 214 pgs.
"Inter Partes Review of U.S. Pat. No. 9,646,517, IPR2019-01122, *Iconex, LLC* v. *MAXStick Products, Ltd.*, Patent Owner's Exhibit 2045—Exhibit A, Stipulated Protected Order (Clean)", (filed Sep. 11, 2019), 9 pgs.
"Inter Partes Review of U.S. Pat. No. 9,646,517, IPR2019-01122, *Iconex, LLC* v. *MAXStick Products, Ltd.*, Patent Owner's Exhibit 2046—Exhibt B, Stipulated Protective Order (Redacted)", (filed Sep. 11, 2019), 9 pgs.
"Inter Partes Review of U.S. Pat. No. 9,646,517, IPR2019-01122, *Iconex, LLC* v. *MAXStick Products, Ltd.*, Patent Owner's Notices under 37 CFR Sec. 42.8", (Jun. 12, 2019), 5 pgs.
"Inter Partes Review of U.S. Pat. No. 9,646,517, IPR2019-01122, *Iconex, LLC* v. *MAXStick Products, Ltd.*, Patent Owner's Statement under 37 CFR 3.73(c)", (Jun. 12, 2019), 4 pgs.
"Inter Partes Review of U.S. Pat. No. 9,208,699, IPR2019-01124, *Iconex, LLC* v. *MAXStick Products, Ltd*, Notice of Filing Date and Time for Filing Patent Owner Preliminary Response", (Jun. 11, 2019), 5 pgs.
"Inter Partes Review of U.S. Pat. No. 9,208,699, IPR2019-01124, *Iconex, LLC* v. *MAXStick Products, Ltd*, Patent Owner's Combined Motion for Entry of Stipulated Protective Order and Motion to Seal", (filed Sep. 11, 2019), 9 pgs.
"Inter Partes Review of U.S. Pat. No. 9,208,699, IPR2019-01124, *Iconex, LLC* v. *MAXStick Products, Ltd*, Patent Owner's Exhibit 2001—Declaration of Thomas Downs", (filed Sep. 11, 2019), 4 pgs.
"Inter Partes Review of U.S. Pat. No. 9,208,699, IPR2019-01124, *Iconex, LLC* v. *MAXStick Products, Ltd*, Patent Owner's Exhibit 2004—Photograph of Label Product with Adhesive Patches", (Sep. 11, 2019), 1 pg.
"Inter Partes Review of U.S. Pat. No. 9,208,699, IPR2019-01124, *Iconex, LLC* v. *MAXStick Products, Ltd*, Patent Owner's Exhibit 2005—U.S. Pat. No. 7,588,811, issued Sep. 15, 2009", (filed Sep. 11, 2019), 12 pgs.
"Inter Partes Review of U.S. Pat. No. 9,208,699, IPR2019-01124, *Iconex, LLC* v. *MAXStick Products, Ltd*, Patent Owner's Exhibit 2006—Photograph of Epson TML90 Printer", (filed Sep. 11, 2019), 1 pg.
"Inter Partes Review of U.S. Pat. No. 9,208,699, IPR2019-01124, *Iconex, LLC* v. *MAXStick Products, Ltd*, Patent Owner's Exhibit 2007—Photograph of POS System", (filed Sep. 11, 2019), 1 pg.
"Inter Partes Review of U.S. Pat. No. 9,208,699, IPR2019-01124, *Iconex, LLC* v. *MAXStick Products, Ltd*, Patent Owner's Exhibit 2008—Photograph of Epson TM88 Printer", (filed Sep. 11, 2019), 1 pg.
"Inter Partes Review of U.S. Pat. No. 9,208,699, IPR2019-01124, *Iconex, LLC* v. *MAXStick Products, Ltd*, Patent Owner's Exhibit 2009—Comparison of the Prior Art Index Mark Label Media and MAXStick Products", (filed Sep. 11, 2019), 1 pg.
"Inter Partes Review of U.S. Pat. No. 9,208,699, IPR2019-01124, *Iconex, LLC* v. *MAXStick Products, Ltd*, Patent Owner's Exhibit 2010—Article entitled "Managing the Concerns of BPA" published Feb. 1, 2009", (filed Sep. 11, 2019), 6 pgs.
Inter Partes Review of U.S. Pat. No. 9,208,699, IPR2019-01124, *Iconex, LLC* v. *MAXStick Products, Ltd*, Patent Owner's Exhibit 2013—Presentation entitled "The World's First Removable and Repositionable Liner Free Label", (filed Sep. 11, 2019), 12 pgs.
"Inter Partes Review of U.S. Pat. No. 9,208,699, IPR2019-01124, *Iconex, LLC* v. *MAXStick Products, Ltd*, Patent Owner's Exhibit 2014—White Paper entitled "Liner-free Thermal Labels"", (filed Sep. 11, 2019), 9 pgs.
"Inter Partes Review of U.S. Pat. No. 9,208,699, IPR2019-01124, *Iconex, LLC* v. *MAXStick Products, Ltd*, Patent Owner's Exhibit 2015—Presentation entitled "Liner Free Adhesive" dated Nov. 19, 2013", (filed Sep. 11, 2019), 27 pgs.
"Inter Partes Review of U.S. Pat. No. 9,208,699, IPR2019-01124, *Iconex, LLC* v. *MAXStick Products, Ltd*, Patent Owner's Exhibit 2017—E-Mail dated Feb. 1, 2013 from Kevin Brown to Mike Vagunas re: MAXStick Patent Testimonal", (filed Sep. 11, 2019), 1 pg.
"Inter Partes Review of U.S. Pat. No. 9,208,699, IPR2019-01124, *Iconex, LLC* v. *MAXStick Products, Ltd*, Patent Owner's Exhibit 2018—E-Mail dated Oct. 22, 2007 from Mark Siedschlag to Robert Green re: MAXStick", (filed Sep. 11, 2019), 2 pgs.
"Inter Partes Review of U.S. Pat. No. 9,208,699, IPR2019-01124, *Iconex, LLC* v. *MAXStick Products, Ltd*, Patent Owner's Exhibit 2020—Article entitled "Solutions Provider Reaps Profits From Customized Label Solution" published Sep. 2012", (filed Sep. 11, 2019), 1 pg.
Inter Partes Review of U.S. Pat. No. 9,208,699, IPR2019-01124, *Iconex, LLC* v. *MAXStick Products, Ltd*, Patent Owner's Exhibit 2021—OKI Data's Press Release "OKI Data Americas Introduces New Liner-free, Repositionable Direct Thermal Receipt Printer to its Expanding Point-Of-Sale Portfolio" dated May 7, 2013, (filed Sep. 11, 2019), 2 pgs.
"Inter Partes Review of U.S. Pat. No. 9,208,699, IPR2019-01124, *Iconex, LLC* v. *MAXStick Products, Ltd*, Patent Owner's Exhibit 2022—Letter dated Feb. 11, 2013 from Barry Jones of Merley Paper Converters Limited", (filed Sep. 11, 2019), 1 pg.
Inter Partes Review of U.S. Pat. No. 9,208,699, IPR2019-01124, *Iconex, LLC* v. *MAXStick Products, Ltd*, Patent Owner's Exhibit 2023—Axiohm's Press Release titled "Axiohm certifies MAXStick first repositionable thermal label to work with its ASTERON panel mount printer, opening the doors to new applications for their printers in medical and test & measurement applications" dated Dec. 10, 2008, (filed Sep. 11, 2019), 2 pgs.
"Inter Partes Review of U.S. Pat. No. 9,208,699, IPR2019-01124, *Iconex, LLC* v. *MAXStick Products, Ltd*, Patent Owner's Exhibit 2024—MAXStick's Press Release "MAXStick Products Ltd. and BIXOLON announce certification of SPP-R200II with MAXStick Liner-Free Labels"", dated Jul. 28, 2014, (filed Sep. 11, 2019), 1 pg.
Inter Partes Review of U.S. Pat. No. 9,208,699, IPR2019-01124, *Iconex, LLC* v. *MAXStick Products, Ltd*, Patent Owner's Exhibit 2025—MAXStick Products' Press Release "MAXStick® Products announces certification on Cubinote Printer dated Jun. 22, 2018", (filed Sep. 11, 2019), 2 pgs.
"Inter Partes Review of U.S. Pat. No. 9,208,699, IPR2019-01124, *Iconex, LLC* v. *MAXStick Products, Ltd*, Patent Owner's Exhibit 2026—MAXStick Products' Press Release "MAXStick® certified by Hwasung Systems for the new HP-500 printer" dated Oct. 10, 2018", (filed Sep. 11, 2019), 1 pg.
"Inter Partes Review of U.S. Pat. No. 9,208,699, IPR2019-01124, *Iconex, LLC* v. *MAXStick Products, Ltd*, Patent Owner's Exhibit 2027—MAXStick Product's Press Release "MAXStick2GO Receives Certification from Seiko Epson Corporation" dated Jun. 30, 2013", (filed Sep. 11, 2019), 1 pg.
"Inter Partes Review of U.S. Pat. No. 9,208,699, IPR2019-01124, *Iconex, LLC* v. *MAXStick Products, Ltd*, Patent Owner's Exhibit 2028—MAXStick Products' Press Release "Star Micronics debuts SM-L300 MAXStick Mobile Printer" dated Jun. 15, 2017", (filed Sep. 11, 2019), 1 pg.
"Inter Partes Review of U.S. Pat. No. 9,208,699, IPR2019-01124, *Iconex, LLC* v. *MAXStick Products, Ltd*, Patent Owner's Exhibit 2029—MAX International's Press Release "Star Micronics recom-

(56) References Cited

OTHER PUBLICATIONS mends MAXStick for use with their TSP650 thermal printer" dated Jun. 2008", (filed Sep. 11, 2019), 1 pg.
"Inter Partes Review of U.S. Pat. No. 9,208,699, IPR2019-01124, *Iconex, LLC* v. *MAXStick Products, Ltd*, Patent Owner's Exhibit 2032—Document entitled "Epson Labeling Solutions"", (filed Sep. 11, 2019), 2 pgs.
"Inter Partes Review of U.S. Pat. No. 9,208,699, IPR2019-01124, *Iconex, LLC* v. *MAXStick Products, Ltd*, Patent Owner's Exhibit 2033—Epson's Press Release "Epson Adds Two MAXStick Meidia Solutions to its List of Tested Media for TM-L90 Plus LFC Thermal Label Printers"", dated Oct. 2016, (filed Sep. 11, 2019), 3 pgs.
Inter Partes Review of U.S. Pat. No. 9,208,699, IPR2019-01124, *Iconex, LLC* v. *MAXStick Products, Ltd*, Patent Owner's Exhibit 2034—Draft Press Release "Epson Annouces TM-T88IV Restick Liner-Free LabeL Printer for Quick Service and Casual Dining Restaurants", (filed Sep. 11, 2019), 4 pgs.
"Inter Partes Review of U.S. Pat. No. 9,208,699, IPR2019-01124, *Iconex, LLC* v. *MAXStick Products, Ltd*, Patent Owner's Exhibit 2035—MAXStick Products' Press Release "MAXStick Products Ltd. and Martel Instruments annouce new MAXStick Liner-Free Label Printers" dated", May 23, 2014, (filed Sep. 11, 2019), 1 pg.
"Inter Partes Review of U.S. Pat. No. 9,208,699, IPR2019-01124, *Iconex, LLC* v. *MAXStick Products, Ltd*, Patent Owner's Exhibit 2036—Letter dated Feb. 18, 2013 from Thomas Nebzwiecki of NETS Products Group LLC", (filed Sep. 11, 2019), 1 pg.
"Inter Partes Review of U.S. Pat. No. 9,208,699, IPR2019-01124, *Iconex, LLC* v. *MAXStick Products, Ltd*, Patent Owner's Exhibit 2037—NETS Products Group Advertisement entitled "Made to Order . . . Made to Stick . . . "", (fied Sep. 11, 2019), 1 pg.
"Inter Partes Review of U.S. Pat. No. 9,208,699, IPR2019-01124, *Iconex, LLC* v. *MAXStick Products, Ltd*, Patent Owner's Exhibit 2038—Letter dated Feb. 15, 2013 from Samer Khashan. President of Team One Repair re: MAXStick Products", (filed Sep. 11, 2019), 1 pg.
"Inter Partes Review of U.S. Pat. No. 9,208,699, IPR2019-01124, *Iconex, LLC* v. *MAXStick Products, Ltd*, Patent Owner's Exhibit 2039—Letter dated Apr. 10, 2013 from Andreas Eissing of McDonalds Germany Inc. to Mike Vigunas", (filed Sep. 11, 2019), 1 pg.
"Inter Partes Review of U.S. Pat. No. 9,208,699, IPR2019-01124, *Iconex, LLC* v. *MAXStick Products, Ltd*, Patent Owner's Exhibit 2040—US 2014/0148542A1, published May 29, 2014", (filed Sep. 11, 2019), 4 pgs.
"Inter Partes Review of U.S. Pat. No. 9,208,699, IPR2019-01124, *Iconex, LLC* v. *MAXStick Products, Ltd*, Patent Owner's Exhibit 2041—U.S. Pat. No. 8,445,104, issued May 21, 2013", (filed Sep. 11, 2019), 14 pgs.
"Inter Partes Review of U.S. Pat. No. 9,208,699, IPR2019-01124, *Iconex, LLC* v. *MAXStick Products, Ltd*, Patent Owner's Exhibit 2042—U.S. Pat. No. 8,537,184, issued Sep. 17, 2013", (filed Sep. 11, 2019), 18 pgs.
"Inter Partes Review of U.S. Pat. No. 9,208,699, IPR2019-01124, *Iconex, LLC* v. *MAXStick Products, Ltd*, Patent Owner's Exhibit 2043—Disclaimer of Claims 1 and 5 of '699 Patent", (filed Sep. 11, 2019), 6 pgs.
"Inter Partes Review of U.S. Pat. No. 9,208,699, IPR2019-01124, *Iconex, LLC* v. *MAXStick Products, Ltd*, Patent Owner's Exhibit 2044—Exhibit A—Protective Order", (filed Sep. 11, 2019), 9 pgs.
"Inter Partes Review of U.S. Pat. No. 9,208,699, IPR2019-01124, *Iconex, LLC* v. *MAXStick Products, Ltd*, Patent Owner's Exhibit 2045—Exhibit B—Protective Order (Redlined)", (filed Sep. 11, 2019), 9 pgs.
"Inter Partes Review of U.S. Pat. No. 9,208,699, IPR2019-01124, *Iconex, LLC* v. *MAXStick Products, Ltd*, Patent Owner's Notices Under 37 C.F.R Sec. 42.8", (filed Jun. 12, 2019), 5 pgs.
"Inter Partes Review of U.S. Pat. No. 9,208,699, IPR2019-01124, *Iconex, LLC* v. *MAXStick Products, Ltd*, Patent Owner's Statement under 37 CFR 3.73(c)", (filed Jun. 12, 2019), 4 pgs.

"Inter Partes Review of U.S. Pat. No. 9,208,699, IPR2019-01124, *Iconex, LLC* v. *MAXStick Products, Ltd*, Petition for Inter Partes Review filed May 22, 2019", 84 pgs.
"Inter Partes Review of U.S. Pat. No. 9,208,699, IPR2019-01124, *Iconex, LLC* v. *MAXStick Products, Ltd*, Petitioner's Exhibit 1001—U.S. Pat. No. 9,208,699 issued Dec. 8, 2015", (filed May 22, 2019), 14 pgs.
"Inter Partes Review of U.S. Pat. No. 9,208,699, IPR2019-01124, *Iconex, LLC* v. *MAXStick Products, Ltd*, Petitioner's Exhibit 1002—Prosecution History of the '699 Patent", (filed May 22, 2019), 214 pgs.
"Inter Partes Review of U.S. Pat. No. 9,208,699, IPR2019-01124, *Iconex, LLC* v. *MAXStick Products, Ltd*, Petitioner's Exhibit 1003—Declaration of Dr. Anthony McHugh dated May 21, 2019", (filed May 22, 2019), 62 pgs.
"Inter Partes Review of U.S. Pat. No. 9,208,699, IPR2019-01124, *Iconex, LLC* v. *MAXStick Products, Ltd*, Petitioner's Exhibit 1004—U.S. Pat. No. 6,432,528 issued Aug. 13, 2002", (filed May 22, 2019), 15 pgs.
"Inter Partes Review of U.S. Pat. No. 9,208,699, IPR2019-01124, *Iconex, LLC* v. *MAXStick Products, Ltd*, Petitioner's Exhibit 1005—US 2004/0250947A1, published Dec. 16, 2004", (filed May 22, 2019), 23 pgs.
"Inter Partes Review of U.S. Pat. No. 9,208,699, IPR2019-01124, *Iconex, LLC* v. *MAXStick Products, Ltd*, Petitioner's Exhibit 1006—U.S. Pat. No. 5,354,588 issued Oct. 11, 1994", (filed May 22, 2019), 5 pgs.
"Inter Partes Review of U.S. Pat. No. 9,208,699, IPR2019-01124, *Iconex, LLC* v. *MAXStick Products, Ltd*, Petitioner's Exhibit 1007—U.S. Pat. No. 5,840,657 issued Nov. 24, 1998", (filed May 22, 2019), 11 pgs.
"Inter Partes Review of U.S. Pat. No. 9,208,699, IPR2019-01124, *Iconex, LLC* v. *MAXStick Products, Ltd*, Petitioner's Exhibit 1008—U.S. Pat. No. 3,051,588 issued Aug. 28, 1962", (filed May 22, 2019), 4 pgs.
"Inter Partes Review of U.S. Pat. No. 9,208,699, IPR2019-01124, *Iconex, LLC* v. *MAXStick Products, Ltd*, Petitioner's Exhibit 1009—U.S. Pat. No. 6,099,943 issued Aug. 8, 2000", (filed May 22, 2019), 5 pgs.
"Inter Partes Review of U.S. Pat. No. 9,208,699, IPR2019-01124, *Iconex, LLC* v. *MAXStick Products, Ltd*, Petitioner's Exhibit 1010—DE 20216483U1, publshed May 15, 2003", (filed May 22, 2019), 11 pgs.
"Inter Partes Review of U.S. Pat. No. 9.208,699, IPR2019-01124, *Iconex, LLC* v. *MAXStick Products, Ltd*, Petitioner's Exhibit 1011—U.S. Pat. No. 5,945,468, issued Aug. 31, 1999", (filed May 22, 2019), 5 pgs.
"Inter Partes Review of U.S. Pat. No. 9,208,699, IPR2019-01124, *Iconex, LLC* v. *MAXStick Products, Ltd*, Petitioner's Exhibit 1012—U.S. Pat. No. 5,661,099, published Aug. 26, 1997", (filed May 22, 2019), 6 pgs.
"Inter Partes Review of U.S. Pat. No. 9,208,699, IPR2019-01124, *Iconex, LLC* v. *MAXStick Products, Ltd*, Petitioner's Exhibit 1013—WO 98/14377A1, published Apr. 9, 1998", (filed May 22, 2019), 37 pgs.
"Inter Partes Review of U.S. Pat. No. 9,208,699, IPR2019-01124, *Iconex, LLC* v. *MAXStick Products, Ltd*, Petitioner's Exhibit 1014—U.S. Pat. No. 5,292,713, issued Mar. 8, 1994", (filed May 22, 2019), 6 pgs.
"Inter Partes Review of U.S. Pat. No. 9,208,699, IPR2019-01124, *Iconex, LLC* v. *MAXStick Products, Ltd*, Petitioner's Exhibit 1015—U.S. Pat. No. 4,870,047, issued Sep. 26, 1989", (filed May 22, 2019), 15 pgs.
"Inter Partes Review of U.S. Pat. No. 9,208,699, IPR2019-01124, *Iconex, LLC* v. *MAXStick Products, Ltd*, Petitioner's Exhibit 1016—U.S. Pat. No. 5,656,705, issued Aug. 12, 1997", (filed May 22, 2019), 9 pgs.
"Inter Partes Review of U.S. Pat. No. 9,208,699, IPR2019-01124, *Iconex, LLC* v. *MAXStick Products, Ltd*, Petitioner's Exhibit 1017—U.S. Pat. No. 6,830,795, issued Dec. 14, 2004", (filed May 22, 2019), 12 pgs.

(56) References Cited

OTHER PUBLICATIONS

"Inter Partes Review of U.S. Pat. No. 9,208,699, IPR2019-01124, *Iconex, LLC* v. *MAXStick Products, Ltd*, Petitioner's Exhibit 1018—U.S. Pat. No. 6,129,965, filed Oct. 10, 2000", (filed May 22, 2019), 7 pgs.

"Inter Partes Review of U.S. Pat. No. 9,208,699, IPR2019-01124, *Iconex, LLC* v. *MAXStick Products, Ltd*, Petitioner's Exhibit 1019—U.S. Pat. No. 6,268,032, issued Jul. 31, 2001", (filed May 22, 2019), 32 pgs.

"Inter Partes Review of U.S. Pat. No. 9,208,699, IPR2019-01124, *Iconex, LLC* v. *MAXStick Products, Ltd*, Petitioner's Exhibit 1020—English Translation of DE 202004018325U1", (filed May 22, 2019), 5 pgs.

"Inter Partes Review of U.S. Pat. No. 9,208,699, IPR2019-01124, *Iconex, LLC* v. *MAXStick Products, Ltd*, Petitioner's Exhibit 1021—U.S. Pat. No. 5,194,329, issued Mar. 16, 1993", (filed May 22, 2019), 4 pgs.

"Inter Partes Review of U.S. Pat. No. 9,208,699, IPR2019-01124, *Iconex, LLC* v. *MAXStick Products, Ltd*, Petitioner's Exhibit 1022—Certification re: DE20216483U1 dated Oct. 14, 2018", (filed May 22, 2019), 2 pgs.

"Inter Partes Review of U.S. Pat. No. 9,208,699, IPR2019-01124, *Iconex, LLC* v. *MAXStick Products, Ltd*, Petitioner's Exhibit 1023—US 2005/0208250A1, published Sep. 22, 2005", (filed May 22, 2019), 11 pgs.

"Inter Partes Review of U.S. Pat. No. 9,208,699, IPR2019-01124, *Iconex, LLC* v. *MAXStick Products, Ltd*, Petitioner's Exhibit 1024—U.S. Pat. No. 3,691,140, filed Sep. 12, 1972", (filed May 22, 2019), 7 pgs.

"Inter Partes Review of U.S. Pat. No. 9,208,699, IPR2019-01124, *Iconex, LLC* v. *MAXStick Products, Ltd*, Petitioner's Exhibit 1025—.S. Pat. No. 5,314,929, filed May 24, 1994", (filed May 22, 2019), 5 pgs.

"Inter Partes Review of U.S. Pat. No. 9,208,699, IPR2019-01124, *Iconex, LLC* v. *MAXStick Products, Ltd*, Petitioner's Exhibit 1026—Prosecution History of U.S. Pat. No. 8,445,104", (filed May 22, 2019), 333 pgs.

"Inter Partes Review of U.S. Pat. No. 9,208,699, IPR2019-01124, *Iconex, LLC* v. *MAXStick Products, Ltd*, Petitioner's Exhibit 1027—Complaint dated Sep. 12, 2018 filed in *Max International Converters, et al.* v. *Iconex LLC* (USDC, District of Delaware)", (filed May 22, 2019), 74 pgs.

"Inter Partes Review of U.S. Pat. No. 9,208,699, IPR2019-01124, *Iconex, LLC* v. *MAXStick Products, Ltd*, Petitioner's Exhibit 1028—DE 20216483U1, published May 15, 2003", (filed May 22, 2019), 11 pgs.

"Inter Partes Review of U.S. Pat. No. 9,208,699, IPR2019-01124, *Iconex, LLC* v. *MAXStick Products, Ltd*, Petitioner's Exhibit 1029—DE 202004018325U1, published Apr. 28, 2005", (filed May 22, 2019), 5 pgs.

"Inter Partes Review of U.S. Pat. No. 9,208,699, IPR2019-01124, *Iconex, LLC* v. *MAXStick Products, Ltd*, Petitioner's Power of Attorney", (filed May 22, 2019), 3 pgs.

"Inter Partes Review of U.S. Pat. No. 8,445,104, IPR2019-0119, *Iconex, LLC* v. *MAXStick Products, Ltd.*, Petitioner's Exhibit 1007—U.S. Pat. No. 5,840,657, published Nov. 24, 1998", (11 pgs.).

"Inter Partes Review of U.S. Pat. No. 8,445,104, IPR2019-0119, *Iconex, LLC* v. *MAXStick Products, Ltd.*, Petitioner's Exhibit 1008—U.S. Pat. No. 3,051,588, published Aug. 28, 1962", (filed May 22, 2019), 4 pgs.

"Inter Partes Review of U.S. Pat. No. 8,445,104, IPR2019-0119, *Iconex, LLC* v. *MAXStick Products, Ltd.*, Petitioner's Exhibit 1009—U.S. Pat. No. 6,099,943, published Aug. 8, 2000", (filed May 22, 2019), 5 pgs.

"Inter Partes Review of U.S. Pat. No. 8,445,104, IPR2019-0119, *Iconex, LLC* v. *MAXStick Products, Ltd.*, Petitioner's Exhibit 1010—DE 20216483U1, published May 15, 2003", (filed May 22, 2019), 11 pgs.

"Inter Partes Review of U.S. Pat. No. 8,445,104, IPR2019-0119, *Iconex, LLC* v. *MAXStick Products, Ltd.*, Petitioner's Exhibit 1011—U.S. Pat. No. 5,945,468, issued Aug. 31, 1999", (filed May 22, 2019), 5 pgs.

"Inter Partes Review of U.S. Pat. No. 8,445,104, IPR2019-0119, *Iconex, LLC* v. *MAXStick Products, Ltd.*, Petitioner's Exhibit 1012—U.S. Pat. No. 5,661,099, issued Aug. 26, 1997", (filed May 22, 2019), 6 pgs.

"Inter Partes Review of U.S. Pat. No. 8,445,104, IPR2019-0119, *Iconex, LLC* v. *MAXStick Products, Ltd.*, Petitioner's Exhibit 1013—WO 98/14377, published Apr. 9, 1998", (May 22, 2019), 37 pgs.

"Inter Partes Review of U.S. Pat. No. 8,445,104, IPR2019-0119, *Iconex, LLC* v. *MAXStick Products, Ltd.*, Petitioner's Exhibit 1014—U.S. Pat. No. 5,292,713, iisued Mar. 8, 1994", (filed May 22, 2019), 6 pgs.

"Inter Partes Review of U.S. Pat. No. 8,445,104, IPR2019-0119, *Iconex, LLC* v. *MAXStick Products, Ltd.*, Petitioner's Exhibit 1015—U.S. Pat. No. 4,870,047, issued Sep. 26, 1989", (filed May 22, 2019), 15 pgs.

"Inter Partes Review of U.S. Pat. No. 8,445,104, IPR2019-0119, *Iconex, LLC* v. *MAXStick Products, Ltd.*, Petitioner's Exhibit 1016—U.S. Pat. No. 5,656,705, issued Aug. 12, 1997", (filed May 22, 2019), 9 pgs.

"Inter Partes Review of U.S. Pat. No. 8,445,104, IPR2019-0119, *Iconex, LLC* v. *MAXStick Products, Ltd.*, Petitioner's Exhibit 1017—U.S. Pat. No. 6,830,795, issued Dec. 14, 2004", (filed May 22, 2019), 12 pgs.

"Inter Partes Review of U.S. Pat. No. 8,445,104, IPR2019-0119, *Iconex, LLC* v. *MAXStick Products, Ltd.*, Petitioner's Exhibit 1018—U.S. Pat. No. 6,129,965, issued Oct. 10, 2000", (filed May 22, 2019), 7 pgs.

"Inter Partes Review of U.S. Pat. No. 8,445,104, IPR2019-0119, *Iconex, LLC* v. *MAXStick Products, Ltd.*, Petitioner's Exhibit 1019—U.S. Pat. No. 6,268,032, issued Jul. 31, 2001", (filed May 22, 2019), 32 pgs.

"Inter Partes Review of U.S. Pat. No. 8,445,104, IPR2019-0119, *Iconex, LLC* v. *MAXStick Products, Ltd.*, Petitioner's Exhibit 1020—DE 20217070U1, published May 15, 2003", (filed May 22, 2019), 20 pgs.

"Inter Partes Review of U.S. Pat. No. 8,445,104, IPR2019-0119, *Iconex, LLC* v. *MAXStick Products, Ltd.*, Petitioner's Exhibit 1021—U.S. Pat. No. 5,194,329, issued Mar. 16, 1993", (filed May 22, 2019), 4 pgs.

"Inter Partes Review of U.S. Pat. No. 8,445,104, IPR2019-0119, *Iconex, LLC* v. *MAXStick Products, Ltd.*, Petitioner's Exhibit 1022—Certification re: Translation of DE 20216483U1 dated Oct. 14, 2018", (filed May 22, 2019), 2 pgs.

"Inter Partes Review of U.S. Pat. No. 8,445,104, IPR2019-0119, *Iconex, LLC* v. *MAXStick Products, Ltd.*, Petitioner's Exhibit 1023—US 2005/0208250A1, publshed Sep. 22, 2005", (filed May 22, 2019), 11 pgs.

"Inter Partes Review of U.S. Pat. No. 8,445,104, IPR2019-0119, *Iconex, LLC* v. *MAXStick Products, Ltd.*, Petitioner's Exhibit 1024—U.S. Pat. No. 3,691,140, issued Sep. 12, 1972", (filed May 22, 2019), 7 pgs.

"Inter Partes Review of U.S. Pat. No. 8,445,104, IPR2019-0119, *Iconex, LLC* v. *MAXStick Products, Ltd.*, Petitioner's Exhibit 1025—U.S. Pat. No. 5,314,929, filed May 24, 1994", (filed May 22, 2019), 5 pgs.

"Inter Partes Review of U.S. Pat. No. 8,445,104, IPR2019-0119,*Iconex, LLC* v. *MAXStick Products, Ltd.*, Petitioner's Exhibit 1026—Not Used", 1 pg.

"Inter Partes Review of U.S. Pat. No. 8,445,104, IPR2019-0119, *Iconex, LLC* v. *MAXStick Products, Ltd.*, Petitioner's Exhibit 1027—Complaint filed Sep. 12, 2019 in *Max International Converters, Inc., et al.* v. *Iconex LLC* (USDC. District of Delaware)", (filed May 22, 2019), 74 pgs.

"Inter Partes Review of U.S. Pat. No. 8,445,104, IPR2019-0119, *Iconex, LLC* v. *MAXStick Products, Ltd.*, Petitioner's Exhibit 1028—DE 20216483U1, publshed May 15, 2003", (filed May 22, 2019), 11 pgs.

(56) References Cited

OTHER PUBLICATIONS

"Inter Partes Review of U.S. Pat. No. 8,445,104, IPR2019-0119, *Iconex, LLC v. MAXStick Products, Ltd.*, Petitioner's Exhibit 1029—DE 20217070U1, published May 15, 2003", (filed May 22, 2019), 20 pgs.
"Inter Partes Review of U.S. Pat. No. 8,445,104, IPR2019-0119, *Iconex, LLC v. MAXStick Products, Ltd.*, Statement Under 37 CFR 3.73(c) dated Jun. 12, 2019", 3 pgs.
"Inter Partes Review of U.S. Pat. No. 9,646,517, IPR2019-01122, *Iconex, LLC v. MAXStick Products Ltd.*, Decision Granting Institution of Inter Partes Review", (Dec. 6, 1999), 28 pgs.
"Inter Partes Review of U.S. Pat. No. 9,646,517, IPR2019-01122, *Iconex, LLC v. MAXStick Products, Ltd.*, Patent Owner's Exhibit 2055, E-Mail dtd Nov. 7, 2019 from J. Muldoon to C. Murphy et al. RE: Failure to Respond to Subpoena in Max Int'l Converters, Inc., et al. v. Iconex", (filed Jan. 17, 2020), 2 pgs.
"Inter Partes Review of U.S. Pat. No. 9,646,517, IPR2019-01122, *Iconex, LLC v. MAXStick Products, Ltd.*, Patent Owner's Exhibit 2047, Second Declaration dated Jan. 17, 2020", (filed Jan. 17, 2020), 8 pgs.
"Inter Partes Review of U.S. Pat. No. 9,646,517, IPR2019-01122, *Iconex, LLC v. MAXStick Products, Ltd.*, Patent Owner's Exhibit 2049, E-Mail from Mike Vigunas to Jerry Butler with the subject MAXStick MNDA dated Apr. 11, 2011", (Jan. 17, 2020), 1 pg.
"Inter Partes Review of U.S. Pat. No. 9,646,517, IPR2019-01122, *Iconex, LLC v. MAXStick Products Ltd.*, Patent Owner's Exhibit 2050, Handwritten Notes of Michael Vigunas", (filed Jan. 17, 2020), 1 pg.
"Inter Partes Review of U.S. Pat. No. 9,646,517, IPR2019-01122, *Iconex, LLC v. MAXStick Products Ltd.*, Patent Owner's Exhibit 2048, Document filed by NCR/Iconex in District of Delaware litigation against Documotion Research Inc. (DI 135)", 7 pgs.
"Inter Partes Review of U.S. Pat. No. 9,646,517, IPR2019-01122, *Iconex, LLC v. MAXStick Products, Ltd.*, Patent Owner's Exhibit 2051, E-Mail from Mike Vigunas to Jerry Butler with the subject RE: NCR/MAXStick Samples dated Apr. 25, 2011", 2 pgs.
"Inter Partes Review of U.S. Pat. No. 9,646,517, IPR2019-01122, *Iconex, LLC v. MAXStick Products Ltd.*, Patent Owner's Exhibit 2053, Document dated Apr. 18, 2011", (filed Jan. 17, 2020), 2 pgs.
"Inter Parties Review of U.S. Pat. No. 9,646,517, IPR2019-01122, *Iconex, LLC v. MAXStick Products Ltd.*, Patent Owner's Exhibit 2054, LinkedIn profile page of Mark Keeton", (filed Jan. 17, 2020), 4 pgs.
"Inter Partes Review of U.S. Pat. No. 9,646,517, IPR2019-01122, *Iconex, LLC v. MAXStick Products, Ltd.*, Patent Owner's Exhibit 2056, Letter from Richard A. Weiss to Michael Vigunas dated Jul. 24, 2014", (Jan. 17, 2020), 1 pg.
"Inter Partes Review of U.S. Pat. No. 9,646,517, IPR2019-01122, *Iconex, LLC v. MAXStick Products, Ltd.*, Patent Owner's Exhibit 2057, Proposed document requests", (filed Jan. 17, 2020), 5 pgs.
"Inter Partes Review of U.S. Pat. No. 9,646,517, IPR2019-01122, *Iconex, LLC v. MAXStick Products, Ltd.*, Patent Owner's Exhibit 2058, Excerpts of document filed in District of Delaware litigation, NCR/Iconex against Documotion Research Inc. (DI 7)", (filed Jan. 17, 2020), 4 pgs.
"Inter Partes Review of U.S. Pat. No. 9,646,517, IPR2019-01122, *Iconex, LLC v. MAXStick Products, Ltd.*, Patent Owner's Exhibit 2059, U.S. Pat. No. 7,820,264", (filed Jan. 17, 2020), 11 pgs.
"Inter Partes Review of U.S. Pat. No. 9,646,517, IPR2019-01122, *Iconex, LLC v. MAXStick Products, Ltd.*, Patent Owner's Exhibit 2060, U.S. Pat. No. 8,711,190", (filed Jan. 17, 2020), 6 pgs.
"Inter Partes Review of U.S. Pat. No. 9,646,517, IPR2019-01122, *Iconex, LLC v. MAXStick Products, Ltd.*, Patent Owner's Exhibit 2061, Excerpts of pretrial order filed in District of Delaware litigation, NCR/Iconex against Documotion Research Inc. (DI 131)", (filed Jan. 17, 2020). 6 pgs.
"Inter Partes Review of U.S. Pat. No. 9,646,517, IPR2019-01122, *Iconex, LLC v. MAXStick Products, Ltd.*, Patent Owner's Exhibit 2062, U.S. Pat. No. 9,208,699", (Jan. 17, 2020), 14 pgs.
"Inter Partes Review of U.S. Pat. No. 9,646,517, IPR2019-01122, *Iconex, LLC v. MAXStick Product, Ltd.*, Patent Owner's Exhibit 2053, Handwritten notes of Michael Vigunas dated May 2011", (filed Jan. 17, 2020), 2 pgs.
"Inter Partes Review of U.S. Pat. No. 9,646,517, IPR2019-01122, *Iconex, LLC v. MAXStick Products, Ltd.*, Patent Owner's Motion for Leave to Take Additional Discovery filed Jan. 17, 2020", 18 pgs.
"Inter Partes Review of U.S. Pat. No. 9,646,517, IPR2019-01122, *Iconex, LLC v. MAXStick Products, Ltd.*, Petitioner's Exhibit 1030, U.S. Pat. No. 8,537,184", (filed Jan. 24, 2020), 18 pgs.
"Inter Partes Review of U.S. Pat. No. 9,646,517, IPR2019-01122, *Iconex, LLC v. MAXStick Products, Ltd.*, Petitioner's Exhibit 1031, MaxStick's Revised Rule 30(b)(6) Notice of Deposition Jan. 16, 2020", (filed Jan. 24, 2020), 12 pgs.
"Inter Partes Review of U.S. Pat. No. 9,646,517, IPR2019-01122, *Iconex, LLC v. MAXStick Products, Ltd.*, Petitioner's Exhibit 1032, Redacted Notice of Subpoena to H.B. Fuller Co.—Nov. 19, 2019", (filed Jan. 24, 2020), 13 pgs.
"Inter Partes Review of U.S. Pat. No. 9,646,517, IPR2019-01122, *Iconex, LLC v. MAXStick Product, Ltd.*, Petitioner's Objections to Patent Owner's Evidence filed Jan. 24, 2020", 4 pgs.
"Inter Partes Review of U.S. Pat. No. 9,646,517, IPR2019-01122, *Iconex, LLC v. MAXStick Products, Ltd.*, Patent Owner Response", (filed Mar. 11, 2020), 82 pgs.
"Inter Partes Review, IPR2019-0119, IPR2019-01122, IPF2019-01124, *Iconex, LLC v. MAXStick Product, Ltd.*, Patent Owner's Exhibit 2064, Second Declaration of William Krahl", (Mar. 11, 2020) 6 pgs.
"Inter Partes Review, IPR2019-0119, IPR2019-01122, IPR2019-01124, *Iconex, LLC v. MAXStick Products, Ltd.*, Patent Owner's Exhibit 2065, Third Declaration of Michael Vigunas", (filed Mar. 11, 2020), 5 pgs.
"Inter Partes Review of U.S. Pat. No. 9,646,517, IPR2019-01122, *Iconex, LLC v. MAXStick Products, Ltd.*, Patent Owner's Exhibit 2066, Press release from Epson regarding Epson TM-T88 and use of MAXStick products at friendly's Express restaurants, dated Jan. 2011", (filed Mar. 11, 2020), 2 pgs.
"Inter Partes Review of U.S. Pat. No. 9,646,517, IPR2019-01122, *Iconex, LLC v. MAXStick Products, Ltd.*, Patent Owner's Exhibit 2067, Article from NRF Stores News entitled 'Sweet Innovation' regarding Friendly's Express use of MAXStick liner-free labels, dated Apr. 21, 2011", (filed Mar. 11, 2020), 1 pg.
"Inter Partes Review of U.S. Pat. No. 9,646,517, IPR2019-01122, *Iconex, LLC v. MAXStick Products, Ltd.*, Patent Owner's Exhibit 2069, Letter from Kevin Brown, President of BayScan Technologies regarding MAXStick's product line", (filed Mar. 11, 2020), 1 pg.
"Inter Partes Review of U.S. Pat. No. 9,646,517, IPR2019-01122, *Iconex, LLC v. MAXStick Products, Ltd.*, Patent Owner's Exhibit 2070, Press release from Epson regarding BayScan Technologies use of Epson TM-T88 and MAXStick products, dated Oct. 26, 2010", (filed Mar. 11, 2020). 2 pgs.
"Inter Partes Review of U.S. Pat. No. 9,646,517, IPR2019-01122, *Iconex, LLC v. MAXStick Products, Ltd.*, Patent Owner's Exhibit 2071, Press release from Epson regarding Epson's TM-T88IV and MAXStick Products, dated Apr. 17, 2008", (filed Mar. 11, 2020), 2 pgs.
"Inter Partes Review of U.S. Pat. No. 9,646,517, IPR2019-01122, *Iconex, LLC v. MAXStick Products, Ltd.*, Patent Owner's Exhibit 2072, Article from QSR Mafazine entitled 'The Results of the 2007 QSR Customer Drive-Thru Preference Survey' dated Oct. 2007", (filed Mar. 11, 2020), 4 pgs.
"Inter Partes Review of U.S. Pat. No. 9,646,517, IPR2019-01122, *Iconex, LLC v. MAXStick Products, Ltd.*, Patent Owner's Exhibit 2073, Press release from Epson, regarding Epson's TM-T88IV and MAXStick labels, dated May 5, 2008", (filed Mar. 11, 2020), 2 pgs.
"Inter Partes Review of U.S. Pat. No. 9,646,517, IPR2019-01122, *Iconex, LLC v. MAXStick Products, Ltd.*, Patent Owner's Exhibit 2075, McHugh Exhibit 4—European Patent Application Publication No. EP1053289 to Wenzel et al. Wenzel)", (filed Mar. 11, 2020), 10 pgs.

(56) References Cited

OTHER PUBLICATIONS

"Inter Partes Review, IPR2019-0119, IPR2019-01122, IPR2019-01124, *Iconex, LLC* v. *MAXStick Products, Ltd.*, Patent Owner's Exhibit 2076, Declaration of Robert Iezzi, Ph.D.", (filed Mar. 11, 2020), 42 pgs.

"Inter Partes Review of U.S. Pat. No. 9,646,517, IPR2019-01122, *Iconex, LLC* v. *MAXStick Products, Ltd.*, Patent Owner's Identification of Additional Counsel Under 37 C.F.R. Section 42.8", (Feb. 26, 2020), 5 pgs.

"Inter Partes Review of U.S. Pat. No. 9,646,517, IPR2019-01122, *Iconex, LLC* v. *MAXStick Products, Ltd.*, Patent Owners Exhibit 2068, Press release from Epson regarding Friendly's Express use of Epson TM-T88 and MAXStick liner-free labels", (filed Mar. 11, 2020), 2 pgs.

"Inter Partes Review of U.S. Pat. No. 9646,517, IPR2019-01122, *Iconex, LLC* v. *MAXStick Products, Ltd.*, Petitioner's Opposition to Patent Owner's Motion for Additional Discovery filed Jan. 24, 2020", 18 pgs.

\* cited by examiner

US 11,224,043 B1

LINERLESS LABELS

RELATED APPLICATIONS

This application is a continuation of U.S. application Ser. No. 16/249,270, filed Jan. 16, 2019, which is a continuation U.S. Application Ser. No. 15/225,232, filed Jan. 8, 2016, which is a continuation of U.S. application Ser. No. 14/215, 776, filed Mar. 17, 2014, which is a continuation of U.S. application Ser. No. 13/838,365, filed Mar. 15, 2013, which is a divisional of U.S. Application Ser. No. 12/712,380, filed Feb. 25, 2010, which applications are incorporated herein by reference in there entirety.

BACKGROUND

Linerless labels are an environmentally friendly labeling solution, avoiding the need for inclusion and/or disposal of a removable release liner. Use of linerless labels may pose a host of problems including increasing the propensity for adhesive build-up in a printer, resulting in printer jams, mis-feeds and/or decreased performance.

SUMMARY

In various embodiments, techniques for design, manufacture and/or use of linerless labels are presented. According to an embodiment, linerless label media is presented. The media includes a first portion, and a second portion. The first portion of the media is situated on a front side of the media and includes one or more thermally sensitive coating(s), and may further include one or more coating(s) of release material. The one or more thermally sensitive coating(s) and/or the one or more release coating(s) may comprise one or more flood and/or patterned thermally sensitive and/or release material coating(s). The second portion of the media is situated on a back side of the media and includes one or more coating(s) of patterned adhesive(s). Depending on the embodiment, the release material(s) may be positioned on top of the thermally sensitive coating(s) on the first portion such that, where the media is wound in a roll, the release material lies proximate to and/or covers the patterned adhesive in a similar pattern thereto, and/or as a flood coat.

A label is configured to be cut (e.g., custom cut at a custom length) from a web or roll of the media via a cutting mechanism of, for example, a thermal printer. The pattern of adhesive(s) situated on the second portion of the media is selected to, for example, reduce contact between the cutting mechanism and the adhesive material(s) of the patterned adhesive. The pattern may also be selected to increase the uniformity of contact occurring between the cutting mechanism and the adhesive material(s) over the length of the cutting mechanism (e.g., knife or blade).

DETAILED DESCRIPTION

FIGS. 1A-1H are diagrams of different configurations for linerless label media, according to various example embodiments. FIGS. 1A-1H are shown for purposes of illustration only. Further configurations are achievable with the teachings presented herein.

In each of the FIGS. 1A-1H a back side of linerless label media is depicted. The back side includes a pattern of adhesive material(s) coated thereon. It is also noted that a front side, opposite the back side, exists for each linerless label media depicted in FIGS. 1A-1H, which front side may include one or more thermally sensitive coating(s), comprising one or more thermally sensitive ink(s), dye(s) and/or pigment(s), that, when thermally activated, may display information, such as information associate with a transaction (e.g., as for a receipt). The front side may further include one or more coating(s) of one or more release material(s), which coating(s) may be provided in flood and/or spot/patterned configurations. Such release material coating(s) may be configured to lie proximate to and/or cover the patterned adhesive when the linerless label media is wound in a roll, facilitating unrolling of the media without the adhesive bonding the back side to the front side. Where provided in patterned configuration, the release material coating(s) may replicate the pattern of the adhesive and thereby selectively cover the adhesive, providing for the above described ease of unwinding, and/or additional readability (human and/or machine) and/or security benefits as described hereinbelow with respect to the patterned adhesive(s). In one embodiment, a pattern of release material is provided on a first media side so as to cover the pattern of adhesive material on a second media side when the media is wound in a roll, wherein such coverage may be in excess of the coverage of the patterned adhesive by a predetermined amount (e.g., 5%, 10%, 20% and the like).

Figure 4:
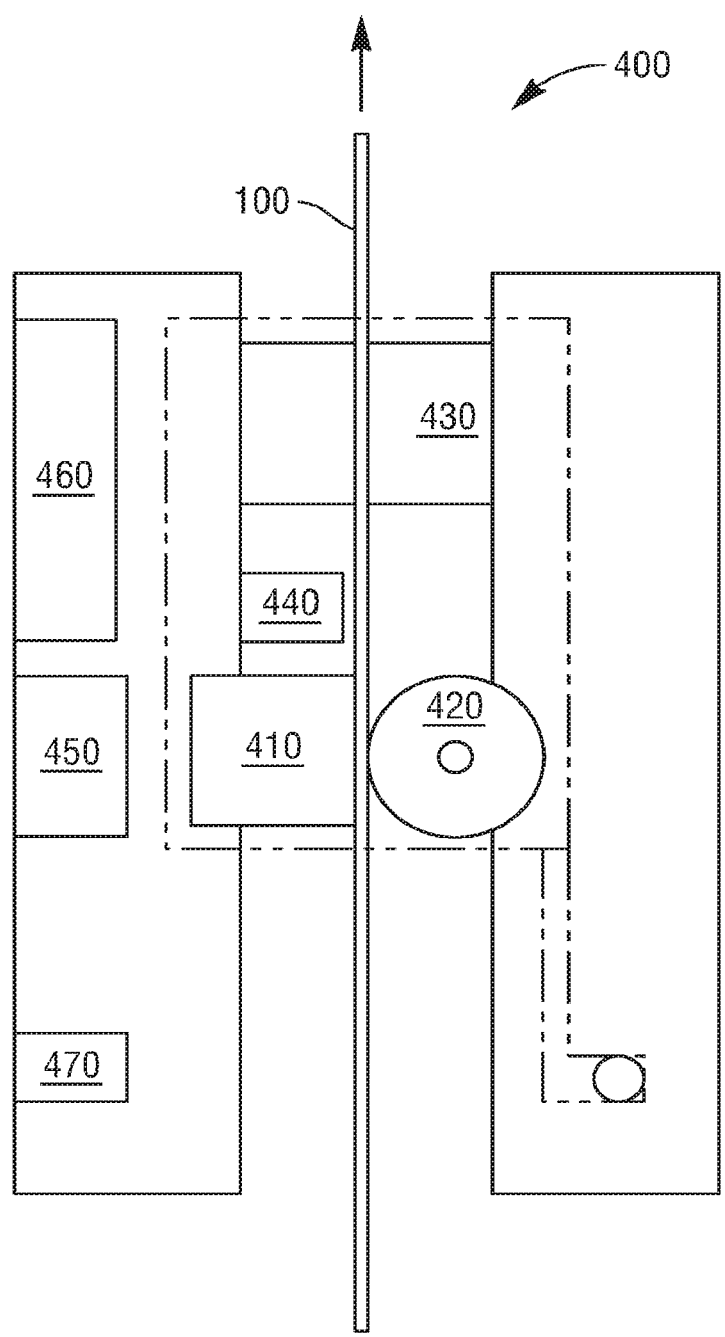
FIG. 4 is a diagram of a thermal printer for thermally printing linerless label media, according to an example embodiment.

The thermally sensitive coatings(s) on the first side of the linerless label media may be activated by feeding the media (including a longitudinally slit portion thereof) through a thermal (e.g., a direct thermal) printer, such as the thermal printer 400 of FIG. 4. As shown in FIG. 4, a thermal printer 400 may include a thermal print head 410, a platen 420, and cutting mechanism 430, such as a knife/blade, a slitter, and the like. The cutting mechanism 430 may be used to custom produce a linerless label of a custom size from installed linerless label media 100. One (first or front) side of the label may include the thermally sensitive coating(s) (activated or not) and/or release material(s), and the other (second or back) side may include the patterns of adhesive materials, as illustrated with respect to FIGS. 1A-1H. The linerless label media 100 may be further be provided in a roll.

As shown in FIG. 4, a thermal printer 400 may further include a motor and/or drive assembly 450 for transporting media 100 through the printer 400 (such as, for example, via driving rotation of the platen 420), a controller 460 (including, for example, a processor, and static/permanent and/or volatile memory) for controlling operation of the printer 400 (such as, for example, signaling a drive assembly 450 to transport media 100 through the printer 400; providing a signal to a print head 410 to print particular information on the media 100; and/or signaling a cutter 430 to cut the media 100 at a location based on a signal provided by a sensor 440 in sensing presence, absence, distribution, and the like of adhesive), and a communication module 470 for receiving print information (e.g., transaction data) and/or commands (e.g., print and/or knife cut commands) from an associated host computer (not shown) and/or providing the same to the controller 460.

Each label may be configured to be custom cut at a custom length from a web or roll of the media via a thermal printer which includes a cutting mechanism. Further, the patterned adhesive may be configured on the second portion of the media in such a manner so as to reduce and/or vary the contact between the cutting mechanism and the adhesive materials. In some embodiments the patterned adhesive may be configured on the second portion of the media in such a manner so as to uniformly/approximately uniformly distribute any contact occurring between a cutting mechanism and the adhesive material over a length/width of the cutting mechanism over the course of continued use thereof/cutting therewith. Such use may include cuts across (e.g., perpendicular to) and/or along (e.g., parallel to) the running axis of a web of media, including multiple cuts to produce like and/or varied length labels from such media. The details of this and the patterns are now presented in detail with reference to the FIGS. 1A-1H.

Figure 1A:
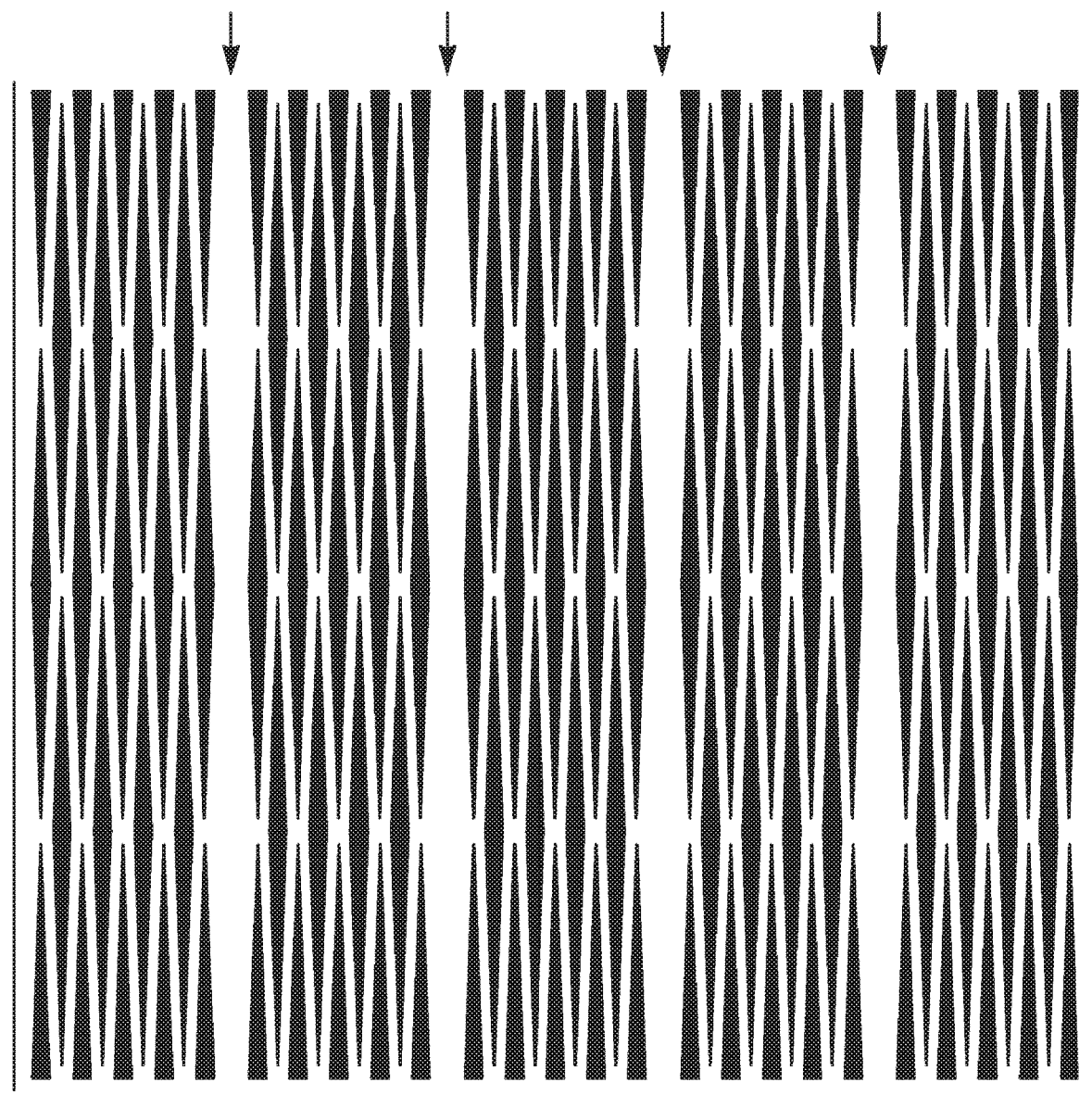
FIGS. 1A-1H are diagrams of different configurations for linerless label media, according to various example embodiments.

In one embodiment, as depicted in the FIG. 1A, the patterned adhesive may be coated on a relatively wide web (e.g., a log roll) of label media in elongated diamond shapes, which shapes may interlock (e.g. cross into the region defined by the maximum width of an adjacent shape, with or without physically overlapping at any location), and may repeat at predefined or random distance(s). After production thereof, such web may be slit lengthwise (e.g., along its running axis) at various widthwise positions thereof (e.g., as illustrated in FIG. 1A by the vertical arrows) to produce various narrower width products (e.g., ~44 mm, ~58 mm, ~80 mm, and like widths) for, for example, end customer use in receipt/label thermal printers.

Figure 1B:
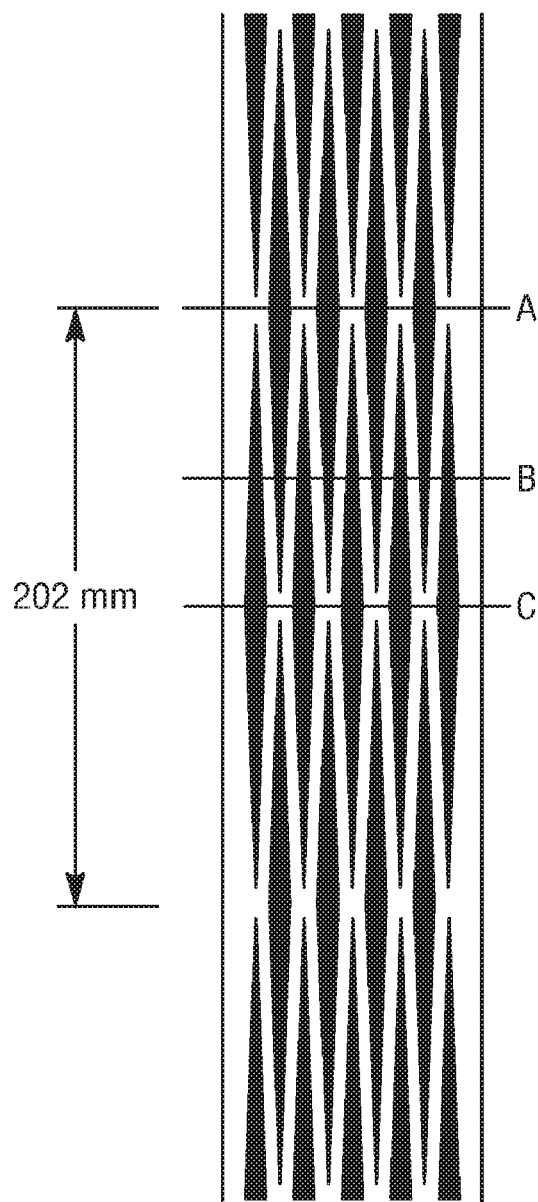

As shown in FIG. 1A, a diamond adhesive pattern may be provided. In the illustration of FIG. 1A, such pattern may be provided on multiple portions of a wide web for, for example, later slitting into a final, narrow width product as illustrated in FIG. 1B. Likewise, as shown in FIG. 1B, such pattern may be centrally located across the width of a narrow width product, and may span only a portion of the width of such final product, although variations are possible (see, e.g., FIG. 1H).

In the embodiment of FIG. 1A, the portion of media that would become the edges of a narrow, slit label product as in, for example, FIG. 1B (e.g., following the vertical arrows down the length of the illustration of FIG. 1A), are free of adhesive to create adhesive free lanes for slitting of the wide with product of FIG. 1A, and thereby mitigate build-up of adhesive on the slitting mechanism (e.g., cutter, knife, and the like). Variations are possible including where the adhesive pattern is offset with respect to the centerline of a final, slit product, and/or where the adhesive spans the width of the wide and/or final slit product, including where no adhesive free lanes are provided for slitting.

In the embodiment of FIG. 1B, a narrow web of media, cut, for example, from the wide web of FIG. 1A, is shown. In FIG. 18, three, potential, horizontal cut locations (A, B, and C) are illustrated. Such cut locations may be utilized during and/or result from cutting the web of media of FIG. 1B to product a label/receipt associated with, for example, three separate transactions, by a cutter or cutting mechanism associated with a thermal (e.g., receipt) printer. As shown, the three cuts would result in three, varied/custom length linerless labels. The first linerless label is represented by the area appearing vertically above the A cut in FIG. 1B. The second linerless label is represented by the area appearing vertically above the B cut and bounded on the top by the A cut in FIG. 1B. Finally, the third linerless label is represented by the area appearing vertically above the C cut and bounded on the top by the B cut in FIG. 1B.

As illustrated in this and other embodiments, problems associated with adhesive buildup on a cutter of a thermal printer can be minimized by patterning the adhesive in a certain manner. For example, the adhesive may be patterned such that the location(s) where the adhesive comes into contact with the cutter may vary with each cut such as, for example, via varying the pattern and/or any repeat of its pattern along the running axis of the web of media, and/or via varying the location of the cut(s) (e.g., as in cut locations A, B and C of FIG. 1B) including as a consequence of the varied length of material that may be required for a given use (e.g., variation of media length with transactions/receipt details) or purposefully via printer control logic (etc). In preferred embodiments the pattern and or the cutting location through the media should spread the adhesive contact across as much of the cutter as possible (e.g., over time) to minimize deposition in localized regions which may adversely affect subsequent cutter performance and/or media feed (resulting in, for example, media mis-feeds and/or jams).

For example, at position "A" in the embodiment of FIG. 1B the cutter passes through adhesive in four discrete locations across the width of the media web. At position "C" the cutter passes through adhesive in five discrete locations, different from the locations of position A (e.g., the adhesive areas at position A and C do not coincide and/or overlap). At position "B" the cutter passes through adhesive in nine discrete locations which, in the embodiment of FIG. 1B, coincide with a portion of each of the locations of positions A and C.

Within the repeat length (if any) of an adhesive pattern, such as that shown in FIG. 1B (e.g., 202 mm), the adhesive distribution across the cutter is different at each of the different, illustrated cross-web cut locations (e.g., A, B and C). Thus the contact between the adhesive and the cutter from the various cuts is distributed across the cutter and, any buildup its, therefore, not concentrated in a particular area or areas. Spreading the adhesive, and any resultant buildup, over the width of the cutter increases the number of cuts required to reach a problem amount of buildup, thereby minimizing the occurrence of associated problems. Further, cutting through regions without adhesive, which adhesive free regions may also vary with different cross-web cut location (e.g., locations A, B and C in FIG. 1B), can assist in cleaning/removing any previously deposited adhesive therefrom.

In addition to mitigating problems associated with adhesive build-up on a printer cutter, selectively patterned adhesive may minimize adhesive buildup on other portions of a printer along a media feed path (e.g., rollers, platens, print heads, and the like), thereby mitigating problems (e.g., media mis-/choppy feed, jams, and the like) associated therewith. Patterned adhesives can reduce these problems.

Patterning the adhesive can also reduce the amount (e.g., surface area) of adhesive in contact with various surfaces and/or portions of the thermal printer. This may allow the use of tackier adhesives without additional printer (e.g., jamming and/or mis-feed) problem.

In addition, patterned adhesive may mitigate issues associated with print media jamming as a result of adhesive bonding/the bond strengthening over time such as, for example, between the period of time when a final print is made on a first day and a period of time when a print is first attempted to be made on a second day.

Depending on the embodiment, it may be desirable to avoid having the repeat length of the adhesive pattern the same or approximately the same as the length of a typical label/receipt such as, for example, where the same length label/receipt is printed/produced repeatedly. This would cause the same part of the cutter to pass through adhesive with every cut, potentially, depending on the embodiment, negating some of the benefits of the patterned adhesive. This problem can be avoided by going to long repeat lengths in the adhesive pattern, and/or randomized adhesive patterns.

Figure 1C:
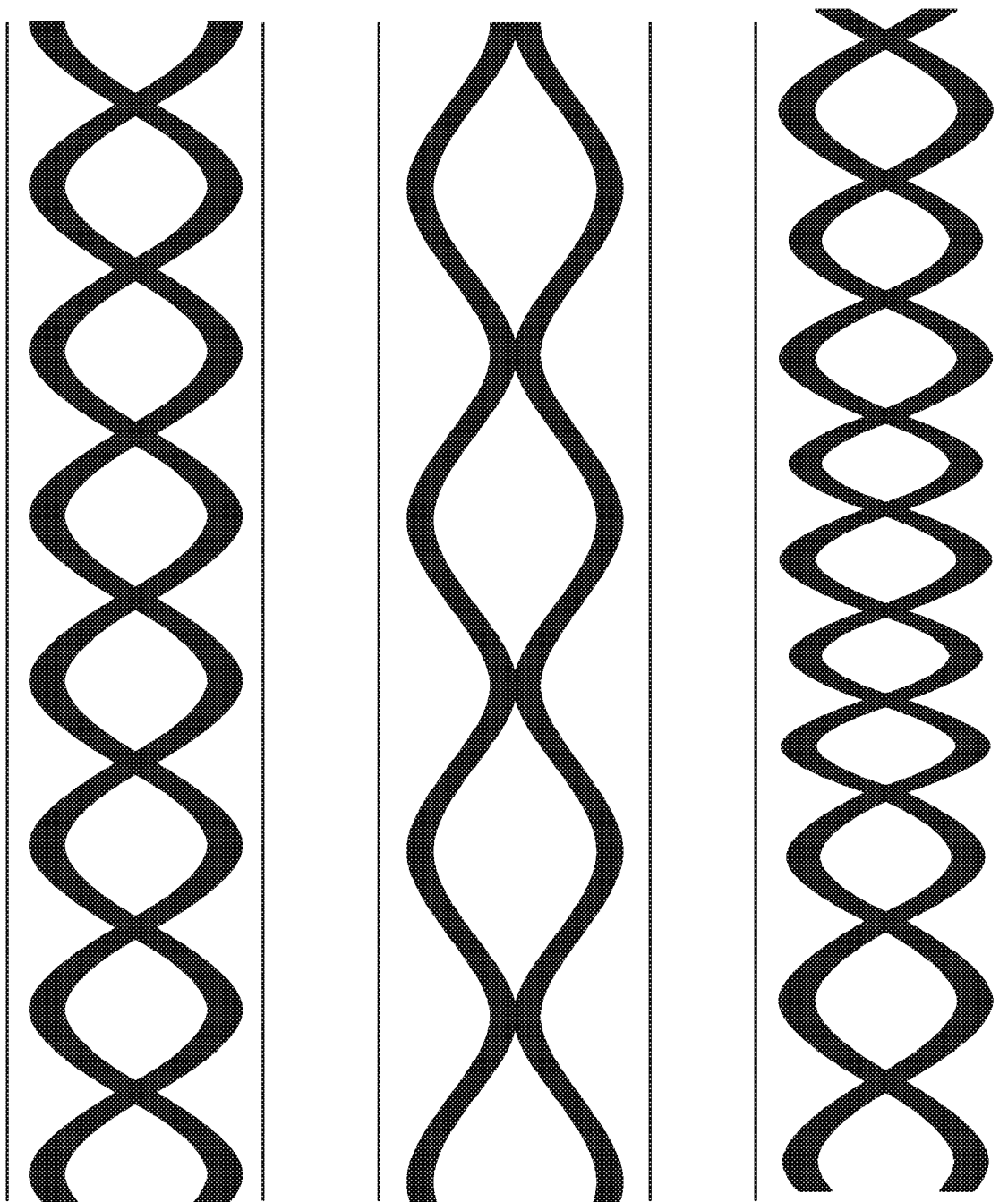

FIG. 10 illustrates various variations in the repeat length of an adhesive pattern. For example, the left pattern in FIG. 1C shows a short repeat length. The center pattern illustrates an adhesive pattern with a modified, increased repeat length. Finally, the right pattern illustrates an adhesive patter with a further modified, increased repeat length. Note, depending on the embodiment, the repeat length may be varied (including increased) without varying the overall nature (including design) of the pattern. Varying the repeat length with respect to an expected cut length/location (e.g., long repeat lengths for typically short receipts) can avoid repeatedly cutting through the same location of a patterned adhesive, and thereby avoid localized/heavy adhesive buildup. The likelihood of a typically short, cut media portion (e.g., label/receipt) length equaling a long adhesive pattern repeat length, and thereby having a cut fall on a similar portion of the pattern, is small. It should be noted that, where possible, repeatedly cutting media portion (e.g., label/receipt) lengths which are and/or are expected to be an integer multiple of the repeat length should be avoided. Likewise, repeat lengths should be selected such that they are longer than, and not an integer multiple of, typical/expected cut media portion (e.g., label/receipt) lengths.

Permissible repeat lengths may be limited depending on the apparatus used to manufacture label media, including applying an adhesive pattern to a substrate/web. For example, for a rotary printing press, the maximum repeat length may be limited to the circumference of the cylinder used to apply the adhesive to the web.

In an embodiment, a gravure coater may be modified to put down a patterned coating (e.g., adhesive). The "normal" gravure cylinder may be replaced by a banded gravure cylinder. A banded gravure cylinder has bands of gravure cells with un-engraved areas between the bands. The absence of gravure cells results in no coating in that area. In a similar manner, patterns may be produced by placing gravure cells in the mirror image of the desired pattern. In essence, a patterned gravure cylinder turns a gravure coater into a simple one-station gravure press.

Figure 1D:
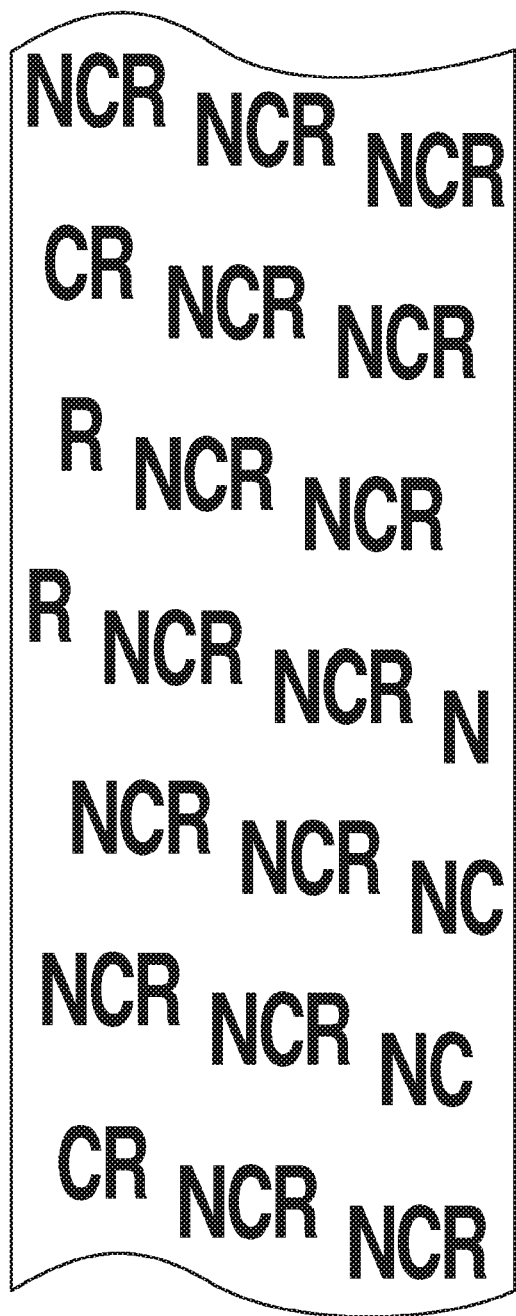

The functionality of an adhesive pattern can be further enhanced by placing or otherwise encoding human or machine readable information in the pattern. This is illustrated with respect to FIG. 1D and FIG. 1E. FIG. 1D shows an adhesive pattern as a series of company logos. In FIG. 1D, the shape of the adhesive comprises a logo (other shapes and sizes, and/or information content(s) are possible), while the pattern thereof is set to distribute the adhesive across the cutter such that cutter contact with adhesive is different at every potential cut-off position within the repeat length of the pattern. In addition to mitigating printer jams and cutter deposition/fouling issues, this configuration provides a methodology for providing for brand recognition and/or document security as it is more difficult to print adhesive than inks, and therefore more costly/difficult to counterfeit. For example, the pattern of FIG. 1D would be extremely difficult to be counterfeited on a personal computer/printer.

Further, adding coloration (e.g., dyes and/or pigments) to the adhesive can make the image more visible/attractive, enhance machine readability, and/or further enhance the security aspect. For example a printed textual and/or graphical image (e.g., NCR in FIG. 1D) may be provided using a green colored adhesive, and thereby be read/viewed directly, and/or with a suitable (e.g., green) spectrum reader. Likewise, security dyes and/or pigments (e.g., ultraviolet (UV) and/or fluorescent) may further enhance the security aspect of the adhesive image, including machine readability. It should be noted that in further embodiments, the shape of the adhesive can be any human and/or machine readable text and/or graphic. Likewise, depending on the shape/characteristics thereof, various information may be encoded in the adhesive and/or its pattern, and/or represented/provided by it.

Figure 1E:
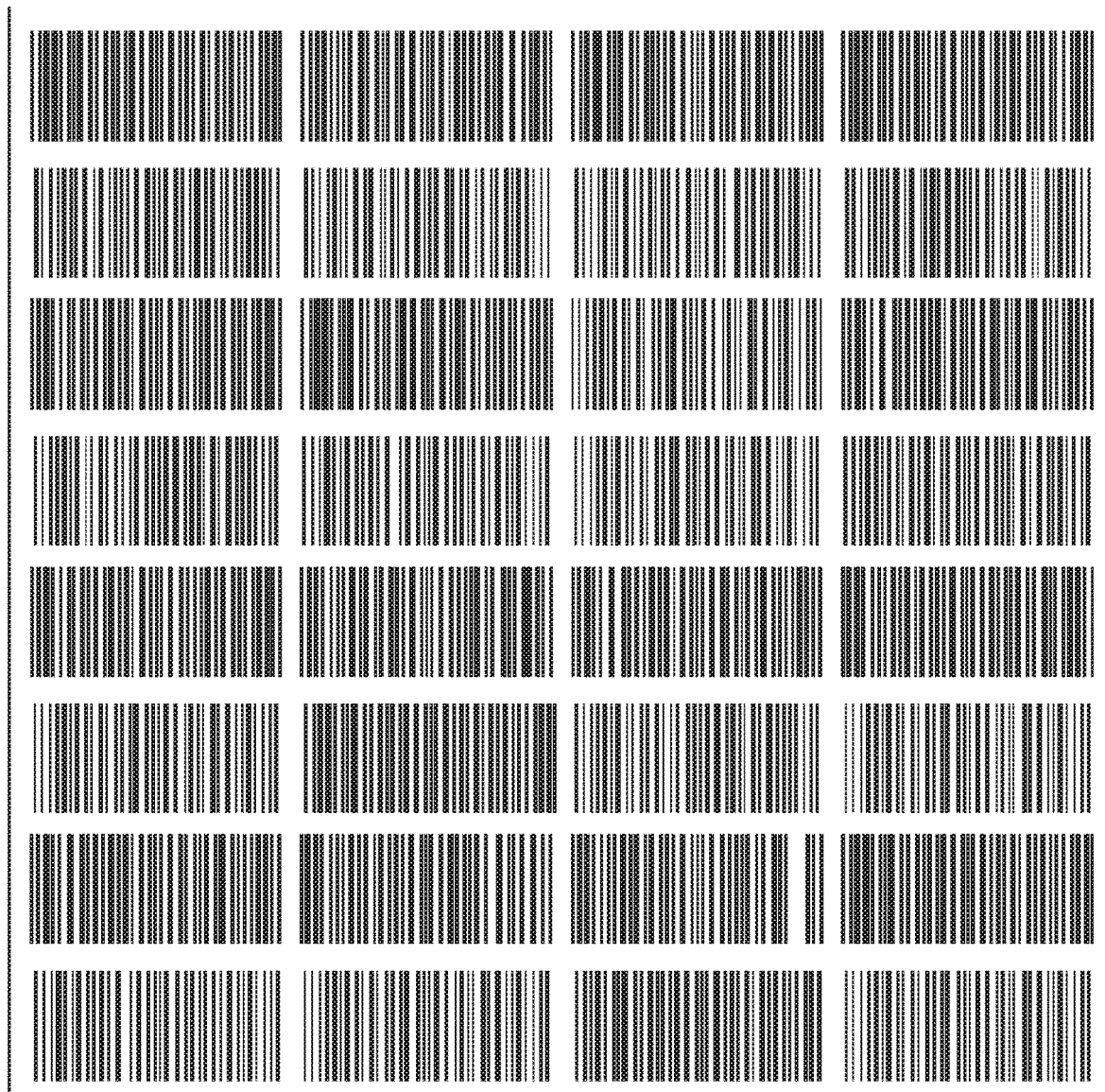

FIG. 1E illustrates a further embodiment of including information in and/or as a result of the shape of the adhesive via using an adhesive pattern comprising (e.g., machine-readable) barcodes. In the example of FIG. 1E, the adhesive image is a 1-D (one dimensional) barcode followed by the inverse image of the same barcode. Such alternating pattern distributes the adhesive across the web in a desired (e.g., non-uniform) manner. As described above, depending on the embodiment, the adhesive may include one or more colorants (e.g., dyes and/or pigments) and/or security markers (e.g., fluorescent dyes and/or pigments) to enhance its human and/or machine viewing/readability. Additionally or alternatively, the substrate surrounding the adhesive pattern may be colored to render the bar code (or other image/pattern) human and/or machine readable, and/or enhance its human and/or machine readability. Such coloring may occur via application of, for example, a water-based coating which may preferentially be absorbed by the substrate surrounding the patterned adhesive, as opposed to the adhesive itself. Such surrounding coloration, including via visible and/or security dyes and/or pigments, makes the barcodes visible to a human and/or machine (e.g., scanner). As stated above, this approach may be used to provide additional security features to a linerless label/receipt. It should be noted that while 1-D barcodes were used in this example, the concept can readily be extended to 2-D barcodes and/or other shapes and/or patterns.

In various embodiments, the machine readable nature of the patterned adhesive may be used to augment use of the physical characteristics of the pattern via triggering a cut of the media to minimize adhesive contact and/or deposition. For example, in various embodiments, features of the adhesive pattern (e.g., presence of adhesive, absence of adhesive, distribution of adhesive, repeat length, including relative location therein) may be sensed (e.g., by a sensor 440, such as an optical sensor, of a thermal printer 400) and a cut location selected to maximize variation of the cut location, such as with respect to the repeat length, and thereby minimize deposits and their resultant deleterious effects. In addition, depending on the pattern, a cut-wise "gap" in the pattern may be sensed (e.g., as between adjacent bar codes in FIG. 1E) and a cut made therein. Likewise, periodic "cleaning" of the print surfaces (e.g., cutter) may be performed by variously and/or alternately selecting cut portions having, for example, a mirror imaged adhesive pattern to that recently, and/or in aggregate formerly, cut through in order to wipe the adhesive contacted areas with non-adhesively coated media portions, and thereby clean the cutting surface(s) of prior deposits. Further, sensing of an adhesive pattern may be performed to cut through a clear or near-clear (or other desired) region irrespective of what the particular print job (e.g. transaction receipt) may require in order to periodically and/or systematically (e.g., when a cut is called for proximate to such a region) clean the entire cutter width and/or minimize new deposition, maximize the variability of the portion of the adhesive pattern cut through, and the like.

Figure 1F:
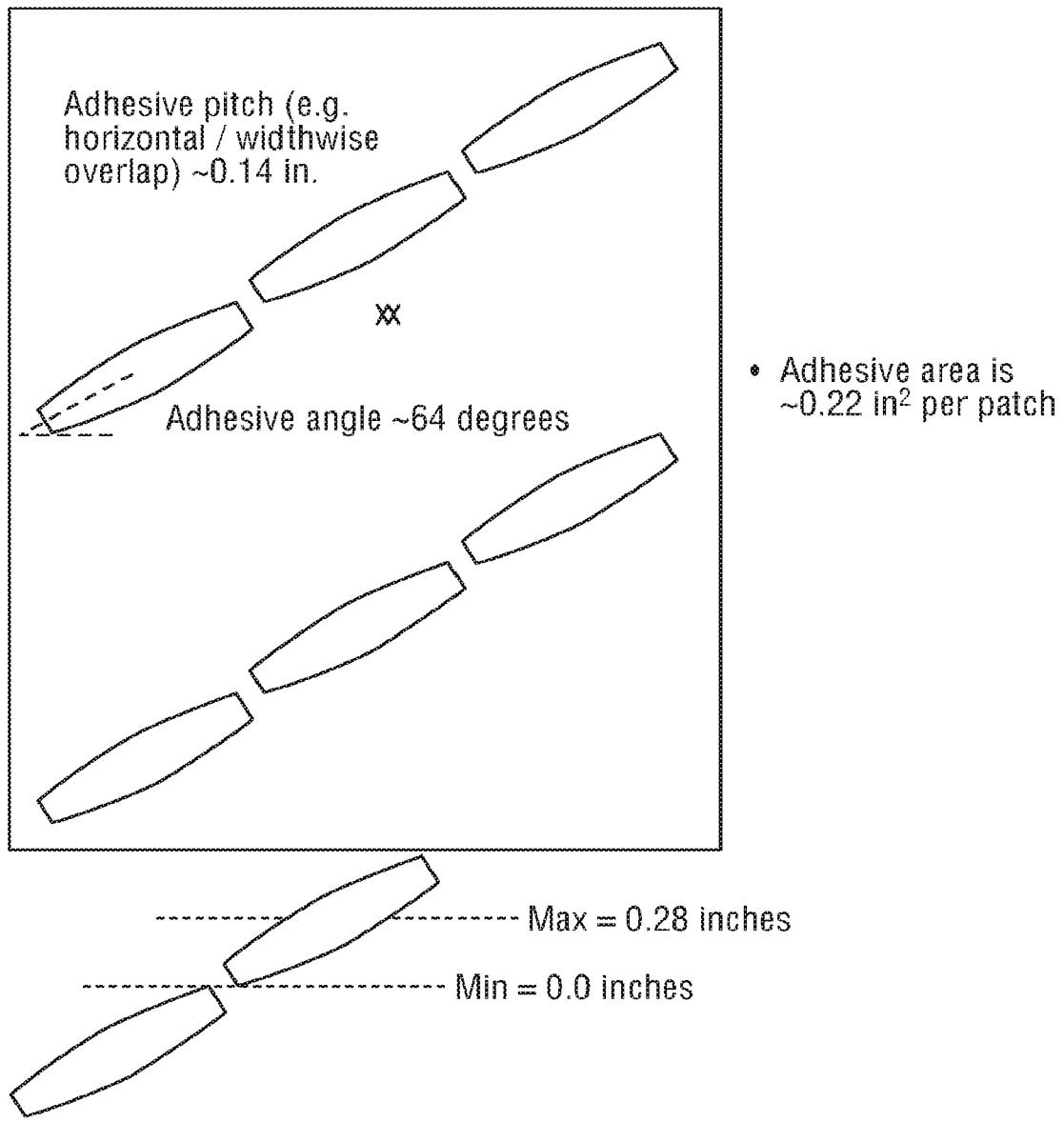

The FIG. 1F shows a further embodiment of a patterned adhesive. Here, a predefined shape of adhesive (shown in the embodiment of FIG. 1F as having two parallel and two convex sides, although other shapes/sizes are permissible) is organized in sets (of, for example, three) having predefined dimensions and situated at predefined angles and pitches within the media roll or web. Additionally, the predefined sets are spaced at predefined distances from one another along the running axis of the roll/web. For the embodiment/dimensions depicted in the FIG. 1F, the probability of no adhesive contact with a cutter is 3%, the probability for maximum adhesive contact is 14%, and, significantly, the probability of achieving between the maximum and minimum (e.g., random) contact is 97%.

Figure 1G:
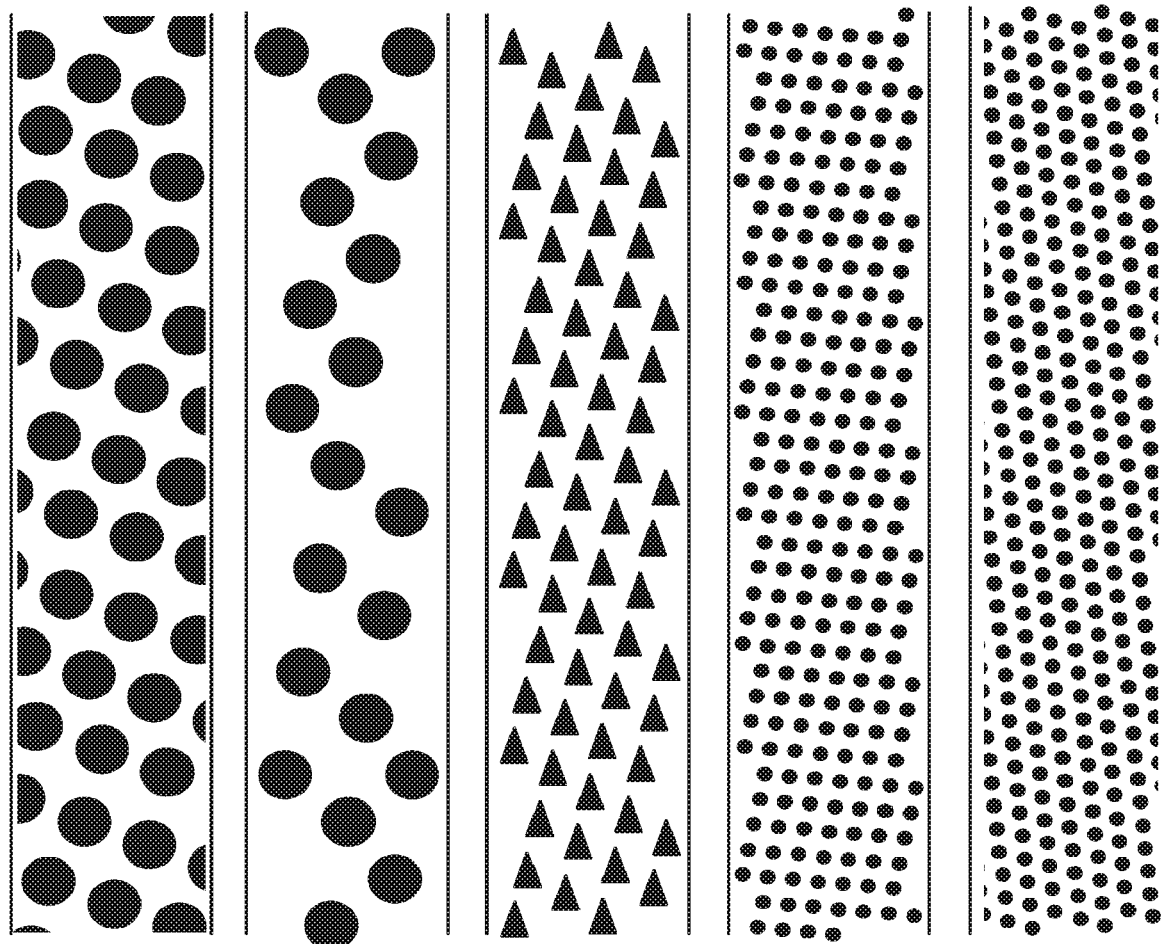
Figure 1H:
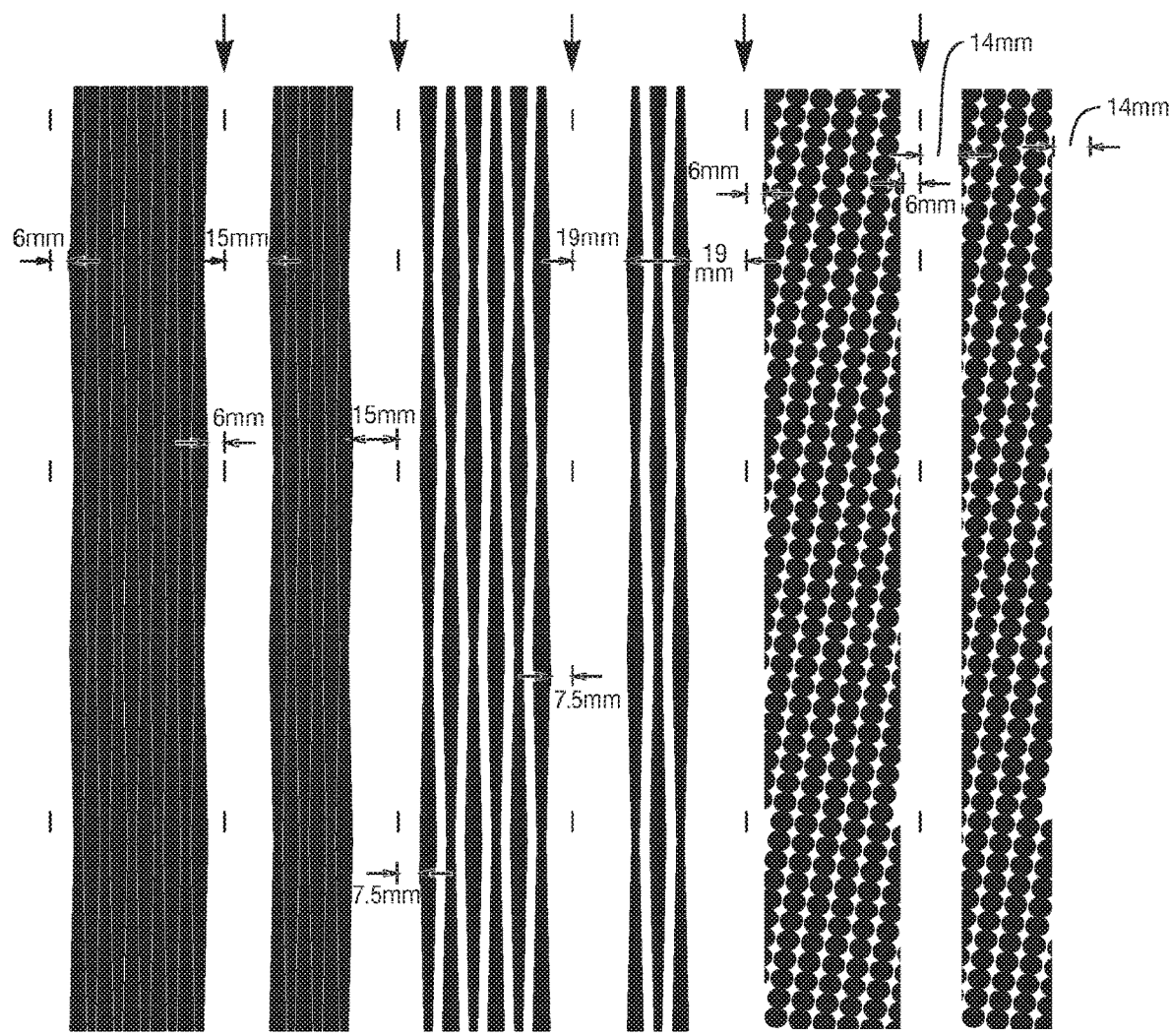

FIGS. 1G and 1H show further embodiments of patterned adhesive for, for example, use in linerless labels. In FIG. 1G, various adhesive shapes (e.g., circles and triangles), and sizes/distributions thereof, on a second side of a narrow media product are shown. In addition, for all of the configurations of FIG. 1G, the patterned adhesive approximately spans the width of the respective illustrated media products, although variations, such as where such patterns span less than the entire width and/or are biased and/or confined to a particular centerline/running axis side, are possible.

FIG. 1H illustrates a wide web of patterned adhesive media having a multitude of different adhesive patterns thereon. Such wide web may be produced by, for example, a gravure coater/press as, for example, described hereinabove. Further, individual (e.g., six in the illustrated embodiment), narrow web products (e.g., for end use in a thermal printer) may be slit from the wide web, or it may be used as produced. In an embodiment, six narrow web products may be slit from the wide web product following and along the direction of the arrows on the top of FIG. 1H.

As shown in FIG. 1H, various adhesive patterns may be produced utilizing having similar, or different, overall elements shapes. For example, the left four patterns all include variations of diamond shaped adhesive. Likewise, the right two patterns both include variations of circular shaped adhesive. In the left four configurations, coverage of the adhesive pattern is varied via varying the uncoated media portion within the region of the media coated with adhesive (e.g., within the overall width of the adhesive band), as well as via varying the size of the region itself (e.g., the width of the adhesive with respect to the width of the web/to-be-slit portion thereof). The right two configurations illustrate variations in coverage with respect to the width of the adhesive band as compared to width of the web/media. In all instances, the illustrated band of adhesive is centered/approximately centered on the width of what would be the narrow media product when the wide web is slit as indicated. Variations are, however, possible, such as where the illustrated band(s) of adhesive are biased with respect to the center of the to-be-cut, narrow web portions, including being biased to one side thereof (including being located proximate to an edge of a to-be-cut, narrow web portion).

As illustrated with respect to the configurations of FIG. 1H, the overall width of a band of adhesive may vary with respect to the width of the web of media, whether taken as a wide web or one or more narrow webs that may be slit therefrom. For example, in various embodiments, the width of a band of adhesive may span a portion of the width of a web of media, including spanning an amount equivalent to approximately 20%, 25%, 50%, 66%, or 80% of such width, and the like. In one embodiment, the width of the band of adhesive is set to be not more than 50% of the width of the web (wide or narrow) of media. In another embodiment, the width of the band of adhesive is set to be not less than approximately 80% of the width of the media web. Variations are possible.

It can be now appreciated that linerless labels can be constructed via patterned adhesive for purposes mitigating deleterious effects of adhesive contacting various portions of a printer including, among other things, a cutter. Likewise, cutting thereof may be performed without sense marks and/or may be performed using the patterned adhesive as a sense marks, further enhancing the beneficial effects. Further, as described hereinabove, a gravure coater/press may be used to prepare a web of patterned adhesive media.

Figure 2:
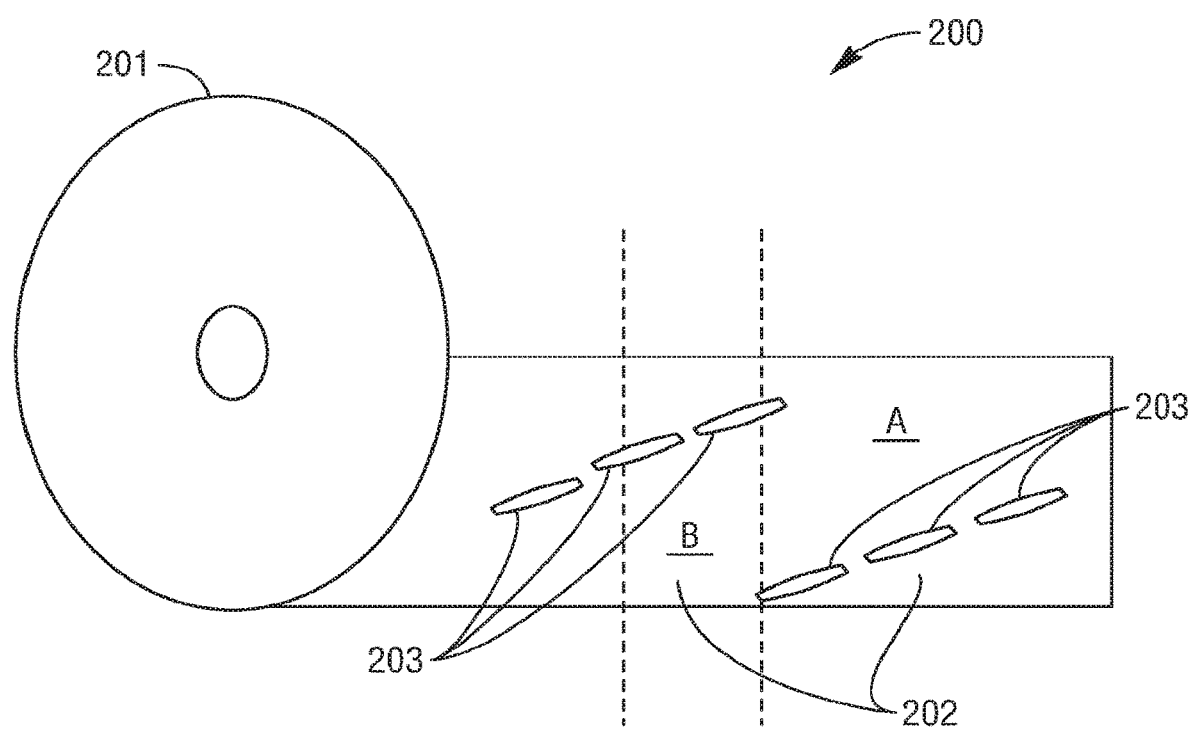
FIG. 2. is a diagram of a linerless label media making apparatus, according to an example embodiment.

FIG. 2. illustrates a diagram of linerless label material 200, according to an example embodiment. While the linerless label material 200 is described hereinbelow with respect to the patterned adhesive of FIG. 1F, the linerless label material 200 may comprise any of the configurations depicted for the patterned adhesive media in FIGS. 1A-1E and/or 1G-1H.

The linerless label material 200 includes a roll or web of media 201 comprising patterned adhesive media in roll form and, thereby, laminated to itself. Linerless label material 200 may be used to provide a series of individual linerless labels 202 (identified as, for example, the regions of unrolled media marked as "A" and "B" in the FIG. 2). Each of these components and their relationship to one another is now discussed in detail below with reference to the FIG. 2.

In various embodiments, the roll of media 201 includes a front side or portion having one or more thermally sensitive coatings (not shown) and a back portion (visible in the FIG. 2) with repeating patterns of adhesive materials 203. A label 202 (shown as, for example, A and B in FIG. 2) may be custom cut from the roll of media 201 by, for example, a cutter of a thermal printer, at custom lengths. The front portion of the label 202 (not shown in the FIG. 2) may further display information (e.g., from a transaction) when the thermally sensitive coating is activated by a thermal print head of the thermal printer.

Once printed/cut, the back portion of a label 202 may permit the label 202 to be affixed to another surface (e.g., carton, container, surface, or substrate) via the adhesive materials. Moreover, the repeating patterns 203 of the adhesive materials are configured or situated on the back portion of the roll of media 201 so as to minimize contact between various surfaces of a thermal printer, such as a cutter blade, and the adhesive materials each time the thermal printer custom cuts a particular label (A or B) from the roll of media 201.

According to an embodiment, the repeating pattern 203 may include information (e.g., via a particular pattern, graphic, text or the like) that is visibly conveyed, or that can be acquired via a scanning device from the adhesive material (such as, for example, via a bar code scanner when the repeating pattern 203 is a bar code as described with respect to FIG. 1C hereinabove).

Further, in various embodiments, some or all of the adhesive material(s) may include colorants to make portions of the adhesive materials visible to the naked eye or visible when exposed to UV light or different predefined frequencies of light.

In a particular case, such as what was discussed above with reference to the FIG. 1F, at least one of the patterns may be configured to have a predefined maximum width, a predefined minimum width, a predefined pitch, a predefined angle, and have respective repeating patterns be separated from one another by a predefined distance on the roll of media 201. This statistically improves the exposure of the cutting mechanism in the thermal printer to the adhesive material at various locations each time a cut is made on the roll of media 201 to produce a linerless label 202.

In yet another situation, the distance between the repeating patterns is configured to be large enough so as to exceed a maximum length for any custom linerless label 202 that produced from the linerless label material 200.

Figure 3:
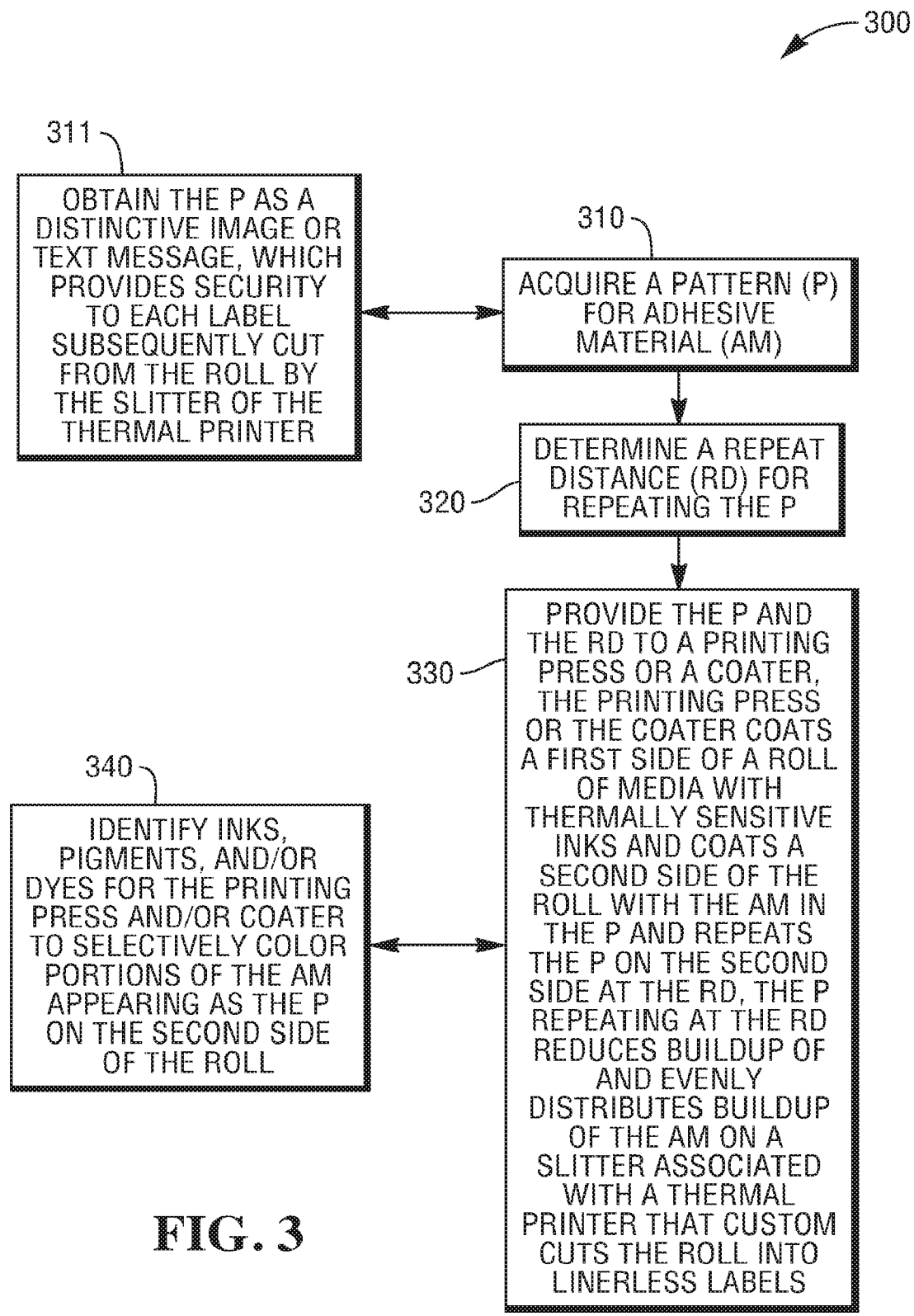
FIG. 3 is a diagram of a method for creating and using linerless label media, according to an example embodiment.

FIG. 3 is a diagram of a method 300 for creating and using a linerless label (such as the linerless label 202 of FIG. 2), according to an example embodiment. The method 300 (hereinafter "labeling process") is implemented in one or more machines adapted to process print media. The labeling process produces and uses the linerless labels discussed with respect to FIGS. 1A-1G and FIG. 2.

At 310, the labeling process acquires a pattern for adhesive material. This can be preconfigured into the machine that executes the labeling process (e.g., via a banded gravure cylinder) or it can be acquired from a database based on the identity of a customer, type of roll or web of media, end use(s) (including printer design/type), and the like.

In one case, at 311, the labeling process obtains the pattern as a distinctive image or text message, which provides security to each label subsequently cut from the roll of media by the slitter or cutter of the thermal printer.

At 320, the labeling process determines a repeat distance for the pattern. Here, the repeat distance can also be a machine configuration parameter, a profile for a customer based on largest known size for a receipt on a cut label, a parameter based on end use (including printer) requirements, and the like.

At 330, the labeling adhesive process provides the pattern and the repeat distance to an adhesive application device (e.g., a printing press or a coater). The printing press or coater may, then, apply a thermally sensitive coating to the first side of the media and/or (including subsequently) coat a second side of the media with the adhesive material in the acquired pattern. The printing press or coater uses the repeat distance to repeat the adhesive pattern on the second side of the roll of media.

The repeating pattern at the repeat distance on the second side of the media assists in reducing buildup of and/or evenly distributing of any buildup of the adhesive material on a slitter or cutter (or other surface) associated with a printer (e.g., a thermal printer) that subsequently prints and/or custom cuts the roll into linerless labels.

According to an embodiment, at 340, the labeling process 300 may also identify colorants (e.g., inks, pigments, and/or dyes) for the printing press and/or coater to selectively color portions of the adhesive materials appearing as the pattern on the second side of the roll. Again, this can be used to reduce counterfeiting and improve linerless label security, as well as provide for improved human and/or machine readability.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A label, comprising:
a substrate having a first side and a second side;
the second side comprising an adhesive layer formed of a plurality of elongated diamond shaped portions of adhesive; and
the first side comprising a thermally sensitive coating and a release coating, wherein the substrate is in a roll configuration and the release coating and adhesive layer are designed such that the adhesive layer sticks to the second side and the adhesive layer releases from the release coating to form a sticky label that can be cut to various sizes.

2. The label of claim 1, wherein the adhesive layer comprises a repeating pattern of the elongated diamond shaped portions of adhesive.

3. The label of claim 2, wherein each elongated diamond shaped portion of adhesive does not overlap within any remaining diamond shaped portions of adhesive.

4. The label of claim 2, wherein each elongated diamond shaped portion of adhesive comprises an elongated diamond shape portion of adhesive.

5. The label of claim 2, wherein each diamond shaped portion of adhesive is separated from an adjacent elongated diamond shaped portion of adhesive by an area that is free of any adhesive material.

6. The label of claim 2, wherein at least one lane is free of any adhesive material and extends a length or a width of the second side between the elongated diamond shaped portions of adhesive.

7. The label of claim 2, wherein the repeating pattern is arranged on the second side to create one or more lanes that extend a length or extend a width across the second side, each lane arranged to mitigate an amount of overlapping with the elongated diamond shaped portions of adhesive.

8. A web of labels, comprising:
a substrate having a first side and a second side;
the first side comprising a thermally sensitive coating; and
the second side comprising a layer of adhesive arranged in patterns of elongated diamond-shaped portions of adhesive;
wherein each pattern of elongated diamond-shaped portions of adhesive separated by an area that is devoid of any adhesive;
wherein the web adapted to be would in a roll of the labels.

9. The web of labels of claim 8, wherein the patterns of elongated diamond-shaped portions of adhesive are repeating patterns of diamond-shaped portions of adhesive.

10. The web of labels of claim 8, wherein the patterns of elongated diamond-shaped portions of adhesive are arranged in an interlocking but non-overlapping arrangement on the second side.

11. The web of labels of claim 8, wherein the thermally sensitive coating is patterned on the first side.

12. The web of labels of claim 8, wherein the thermally sensitive coating is flood patterned on the first side.

13. The web of labels of claim 8, further comprising, at least one of: 1) the first side and 2) the second side comprising a release coating adapted to prevent the adhesive layer from adhering to the first side when the web is wound into the roll.

* * * * *

UNITED STATES PATENT AND TRADEMARK OFFICE
CERTIFICATE OF CORRECTION

Page 1 of 3

PATENT NO. : 11,224,043 B1
APPLICATION NO. : 16/685328
DATED : January 11, 2022
INVENTOR(S) : Roth et al.

It is certified that error appears in the above-identified patent and that said Letters Patent is hereby corrected as shown below:

On the Title Page

In Column 1, under "Related U.S. Application Data", Line 1, delete "(60)" and insert --(63)-- therefor On page 2, in Column 2, item (56) under "Other Publications", Line 33, delete "Notce" and insert --Notice-- therefor On page 2, in Column 2, item (56) under "Other Publications", Line 60, delete "Espon" and insert --Epson-- therefor On page 2, in Column 2, item (56) under "Other Publications", Line 63, delete "Comparision" and insert --Comparison-- therefor On page 2, in Column 2, item (56) under "Other Publications", Line 67, delete "publised" and insert --published-- therefor On page 2, in Column 2, item (56) under "Other Publications", Line 68, delete "Adhsives" and insert --Adhesives-- therefor On page 3, in Column 1, item (56) under "Other Publications", Line 12, delete "Testimonal" and insert --Testimonial-- therefor On page 3, in Column 1, item (56) under "Other Publications", Line 35, delete "mout" and insert --mount-- therefor On page 3, in Column 1, item (56) under "Other Publications", Line 36, delete "fortheir" and insert --for their-- therefor On page 3, in Column 1, item (56) under "Other Publications", Line 42, delete "annouce" and insert --announce-- therefor Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,224,043 B1

On page 3, in Column 1, item (56) under "Other Publications", Line 47, delete "Internation" and insert --International-- therefor On page 3, in Column 2, item (56) under "Other Publications", Line 16, delete "Annouces" and insert --Announces-- therefor On page 3, in Column 2, item (56) under "Other Publications", Line 22, delete "annouce" and insert --announce-- therefor On page 3, in Column 2, item (56) under "Other Publications", Line 30, delete "entield" and insert --entitled-- therefor On page 3, in Column 2, item (56) under "Other Publications", Line 47, delete "Exhit" and insert --Exhibit-- therefor On page 3, in Column 2, item (56) under "Other Publications", Line 51, delete "Exhibt" and insert --Exhibit-- therefor On page 4, in Column 2, item (56) under "Other Publications", Line 58, delete "Constuing" and insert --Construing-- therefor On page 6, in Column 1, item (56) under "Other Publications", Line 30, delete "entiteld" and insert --entitled-- therefor On page 6, in Column 1, item (56) under "Other Publications", Line 47, delete "Testimonal" and insert --Testimonial-- therefor On page 6, in Column 2, item (56) under "Other Publications", Line 2, delete "termal" and insert --thermal-- therefor On page 6, in Column 2, item (56) under "Other Publications", Line 3, delete "fortheir" and insert --for their-- therefor On page 6, in Column 2, item (56) under "Other Publications", Line 9, delete "annouce" and insert --announce-- therefor On page 6, in Column 2, item (56) under "Other Publications", Line 55, delete "annouce" and insert --announce-- therefor On page 6, in Column 2, item (56) under "Other Publications", Line 63, delete "entield" and insert --entitled-- therefor On page 7, in Column 1, item (56) under "Other Publications", Line 25, delete "Exhibt" and insert --Exhibit-- therefor

CERTIFICATE OF CORRECTION (continued)
U.S. Pat. No. 11,224,043 B1

On page 7, in Column 2, item (56) under "Other Publications", Line 18, delete "Testimonal"," and insert --Testimonial",-- therefor On page 8, in Column 1, item (56) under "Other Publications", Line 9, delete "Meidia" and insert --Media-- therefor On page 8, in Column 1, item (56) under "Other Publications", Line 14, delete "Annouces" and insert --Announces-- therefor On page 8, in Column 1, item (56) under "Other Publications", Line 15, delete "LabeL" and insert --Label-- therefor On page 8, in Column 1, item (56) under "Other Publications", Line 20, delete "annouce" and insert --announce-- therefor On page 8, in Column 1, item (56) under "Other Publications", Line 29, delete "(fied" and insert --(filed-- therefor On page 8, in Column 2, item (56) under "Other Publications", Line 42, delete "publshed" and insert --published-- therefor On page 9, in Column 2, item (56) under "Other Publications", Line 14, delete "iisued" and insert --issued-- therefor On page 9, in Column 2, item (56) under "Other Publications", Line 50, delete "publshed" and insert --published-- therefor On page 9, in Column 2, item (56) under "Other Publications", Line 70, delete "publshed" and insert --published-- therefor On page 10, in Column 2, item (56) under "Other Publications", Lines 2-3, delete "Exhibit Exhibit" and insert --Exhibit-- therefor On page 10, in Column 2, item (56) under "Other Publications", Line 60, delete "Mafazine" and insert --Magazine-- therefor